(12) United States Patent
Miu et al.

(10) Patent No.: US 11,460,536 B2
(45) Date of Patent: Oct. 4, 2022

(54) CIRCULARLY POLARIZED AUTOMOTIVE RADAR FOR IMPROVED SIGNAL TO NOISE RATIO

(71) Applicant: Magna Closures Inc., Newmarket (CA)

(72) Inventors: Traian Miu, Oakville (CA); Gabriele Wayne Sabatini, Keswick (CA)

(73) Assignee: MAGNA CLOSURES, INC., Newmarket (CA)

( * ) Notice: Subject to any disclaimer, the term of this patent is extended or adjusted under 35 U.S.C. 154(b) by 382 days.

(21) Appl. No.: 16/568,894

(22) Filed: Sep. 12, 2019

(65) Prior Publication Data
US 2020/0088839 A1    Mar. 19, 2020

Related U.S. Application Data

(60) Provisional application No. 62/730,591, filed on Sep. 13, 2018.

(51) Int. Cl.
*G01S 7/02*    (2006.01)
*G01S 7/41*    (2006.01)
*G01S 13/04*   (2006.01)

(52) U.S. Cl.
CPC .............. *G01S 7/026* (2013.01); *G01S 7/023* (2013.01); *G01S 7/414* (2013.01); *G01S 13/04* (2013.01)

(58) Field of Classification Search
CPC .......... G01S 7/026; G01S 7/023; G01S 7/414; G01S 13/04; G01S 7/41; G01S 13/931; G01S 13/93; G01S 7/02; G01S 7/285
See application file for complete search history.

(56) References Cited

U.S. PATENT DOCUMENTS

| | | | | |
|---|---|---|---|---|
| 3,854,140 A | * | 12/1974 | Ranghelli | H01Q 25/001 343/756 |
| 5,216,430 A | * | 6/1993 | Rahm | H01Q 9/0435 343/700 MS |
| 6,067,041 A | * | 5/2000 | Kaiser | G01S 7/4052 342/171 |
| 6,624,780 B1 | * | 9/2003 | Fouts | G01S 7/021 342/25 R |
| 7,009,551 B1 | | 3/2006 | Sapletal et al. | |
| 7,333,455 B1 | * | 2/2008 | Bolt | H04B 7/10 370/329 |

(Continued)

FOREIGN PATENT DOCUMENTS

| | | |
|---|---|---|
| EP | 2122599 A2 | 11/2009 |
| EP | 3617736 A1 | 4/2020 |
| WO | 2018087365 A1 | 5/2018 |

*Primary Examiner* — Donald H B Braswell
(74) *Attorney, Agent, or Firm* — Dickinson Wright PLLC

(57) ABSTRACT

A sensor assembly for detecting an object is disclosed. The sensor assembly includes at least one radar transmitter configured to emit transmitted radar waves having a first polarization. The sensor assembly also includes at least one radar receiver configured to receive the transmitted radar waves after reflecting from the object as reflected radar waves having a second polarization different than the first polarization and corresponding with a detection of the object relative to the sensor assembly. The at least one radar receiver is additionally configured to reject radar waves having a polarization being different than the second polarization to disregard noise generated by environmental interaction of the transmitted radar waves and from extraneous radar sources.

16 Claims, 22 Drawing Sheets

(56) References Cited

U.S. PATENT DOCUMENTS

| | | |
|---|---|---|
| 2008/0018523 A1* | 1/2008 | Kelly, Jr. ............... G01S 13/48 |
| | | 342/70 |
| 2009/0251362 A1* | 10/2009 | Margomenos ........ G01S 13/931 |
| | | 342/175 |
| 2017/0010347 A1* | 1/2017 | Schütte ................. G01S 7/4052 |
| 2018/0120413 A1* | 5/2018 | Stoeckle .................. G01S 7/03 |
| 2019/0165488 A1* | 5/2019 | Au ......................... H01Q 21/26 |
| 2019/0187247 A1 | 6/2019 | Izadian et al. |
| 2020/0011989 A1 | 1/2020 | Takahashi et al. |
| 2020/0072947 A1 | 3/2020 | Miu et al. |
| 2020/0166637 A1 | 5/2020 | Hess et al. |

* cited by examiner

206 — Controlling a plurality of transmit encoding switches each coupled to one of a plurality of radar transmit antennas being configured to transmit the transmitted radar waves with a different respective polarization than another one of the plurality of radar transmit antennas to modulate a radar signature comprised of sequential transmissions by each of the plurality of radar transmit antennas with the different respective polarization 208 — Controlling a plurality of receive decoding switches each coupled to one of a plurality of radar receive antennas being configured to receive the reflected radar waves with the different respective polarization to receive the reflected radar signature

FIGURE 23

CIRCULARLY POLARIZED AUTOMOTIVE RADAR FOR IMPROVED SIGNAL TO NOISE RATIO

CROSS REFERENCE TO RELATED APPLICATION

This application claims the benefit of U.S. Provisional Application Ser. No. 62/730,591 filed Sep. 13, 2018. The entire disclosure of the above application is incorporated herein by reference.

FIELD

The present disclosure relates generally to a sensor assembly and more specifically to a sensor assembly utilizing polarized radar in a vehicle and a method of operating the sensor assembly.

BACKGROUND

This section provides background information related to the present disclosure which is not necessarily prior art.

Motor vehicles are increasingly being equipped with sensors that detect the environment and terrain surrounding the motor vehicle. For example, some vehicles include sensor assemblies that provide real-time data regarding the terrain and/or other objects in the vicinity of the vehicle. More specifically, sensor assemblies utilizing radar have been used to detect the presence and position of objects near the motor vehicle while the vehicle is stationary or while the vehicle is moving. The signals and data generated by these sensor assemblies can be used by various systems of the motor vehicle to provide safety features such as vehicle control, collision avoidance, and parking assistance and can, for example, assist the driver while he or she is driving the motor vehicle and/or to intervene in controlling the vehicle.

Radar technology can work well in many environmental conditions; however, transmission losses can occur due in inclement environments that result in dispersion of electromagnetic waves. For example, radar may be reflected from rain drops or other non-desired environmental objects in addition to being reflected from desired target objects. Sensor assemblies may therefore receive reflections from both the non-desired environmental objects (e.g., rain drops) and desired target objects, necessitating the use of complex processing to filter out noise generated by the reflections from the non-desired environmental objects. Also, as the use of such sensor assemblies or systems proliferate, the importance of rejecting or disregarding third party sensor signals (e.g., radar waves from another vehicle) becomes increasingly important.

Thus, there is an increasing need for improved sensor assemblies capable of operating in the presence of third party sensor signals and other environmental noise. Furthermore, other desirable features and characteristics of the present disclosure will become apparent from the subsequent detailed description and the appended claims, taken in conjunction with the accompanying drawings and the foregoing technical field and background.

SUMMARY

This section provides a general summary of the present disclosure and is not intended to be interpreted as a comprehensive disclosure of its full scope or all of its features, aspects and objectives.

Accordingly, it is an aspect of the present disclosure to provide a sensor assembly for detecting an object. The sensor assembly includes at least one radar transmitter configured to emit transmitted radar waves that have a first polarization. The sensor assembly also includes at least one radar receiver configured to receive the transmitted radar waves after reflecting from the object as reflected radar waves that have a second polarization different than the first polarization. The reflected radar waves received by the at least one radar receiver correspond with a detection of the object relative to the sensor assembly. The at least one radar receiver is additionally configured to reject radar waves having a polarization being different than the second polarization to disregard noise generated by environmental interaction of the transmitted radar waves and from extraneous radar sources.

According to another aspect of the disclosure, a method of operating a sensor assembly for detecting an object is provided. The method begins with the step of emitting transmitted radar waves having a first polarization using at least one radar transmitter. The method proceeds by receiving the transmitted radar waves after reflecting from the object as reflected radar waves having a second polarization different than the first polarization and corresponding with a detection of the object relative to the sensor assembly using at least one radar receiver. The method then continues with the step of rejecting radar waves having a polarization being different than the second polarization to disregard noise generated by environmental interaction of the transmitted radar waves and from extraneous radar sources using the at least one radar receiver.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

Figure 5:
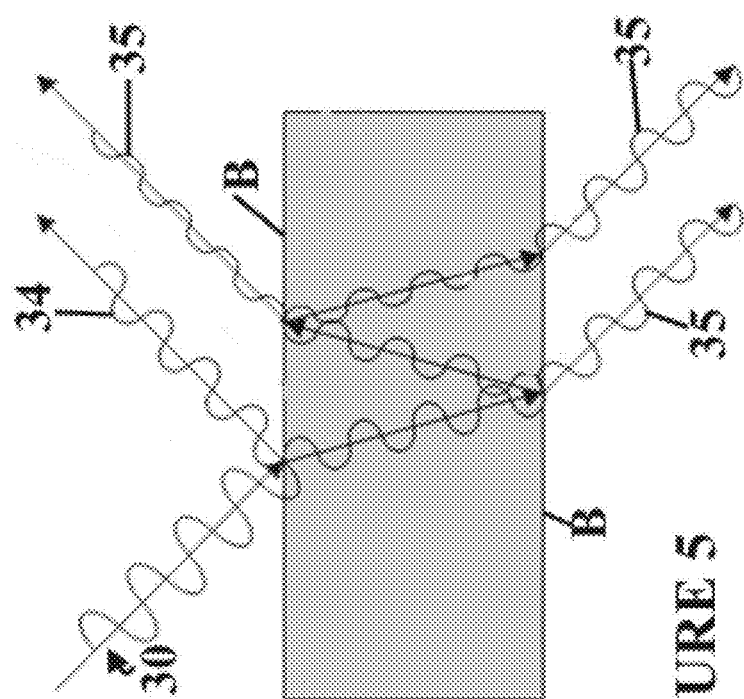
Figure 4:
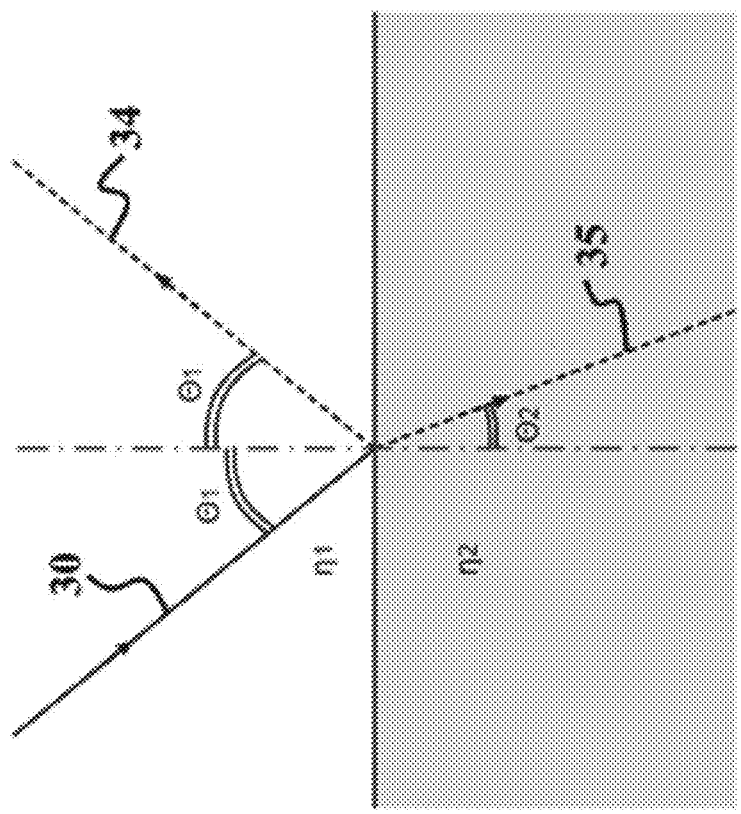
Figure 6:
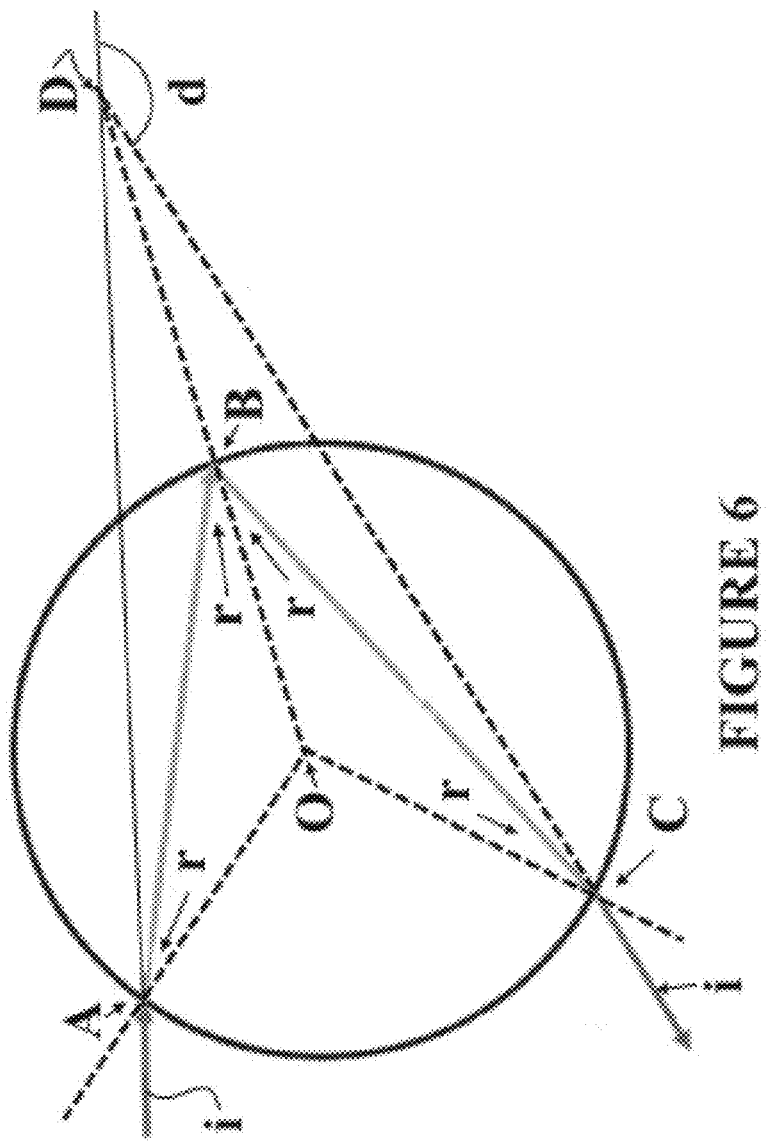
Figure 7:
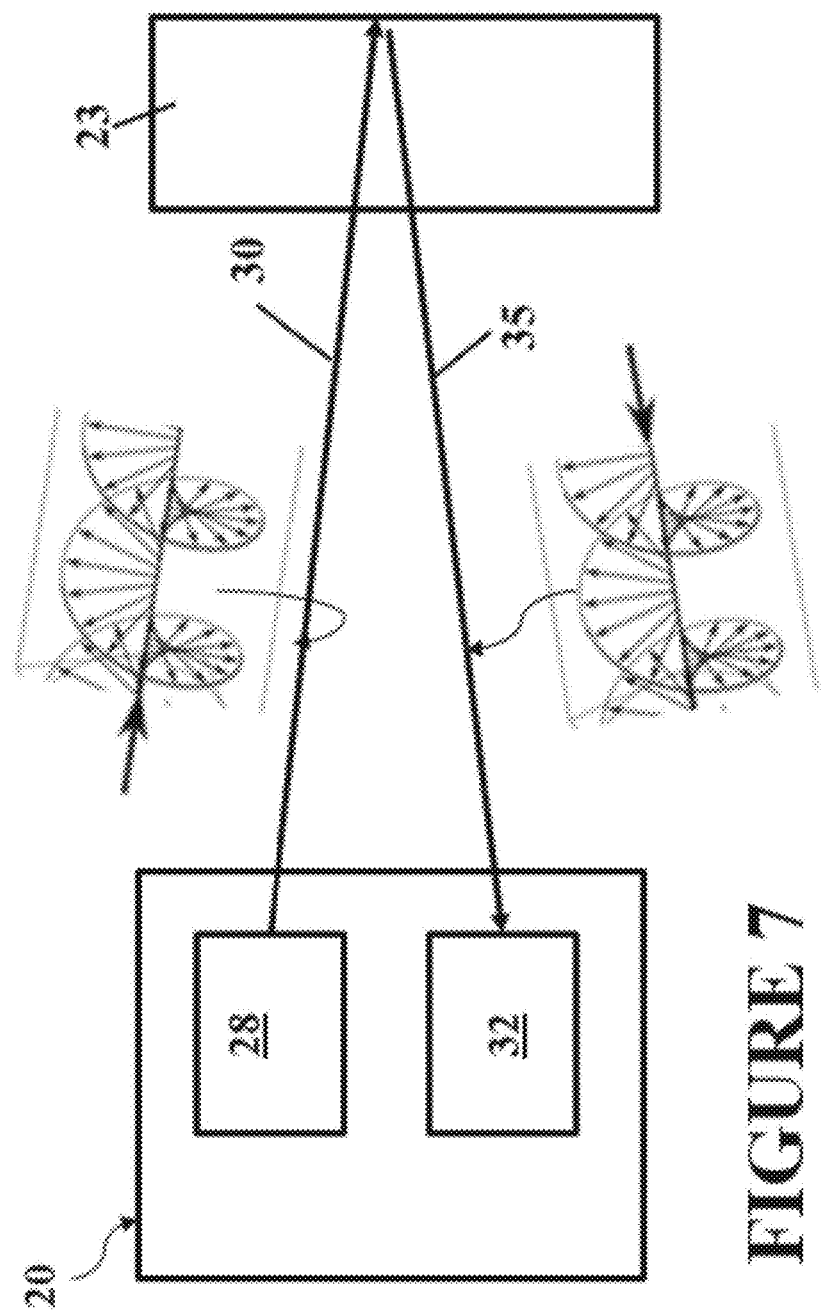
Figure 8:
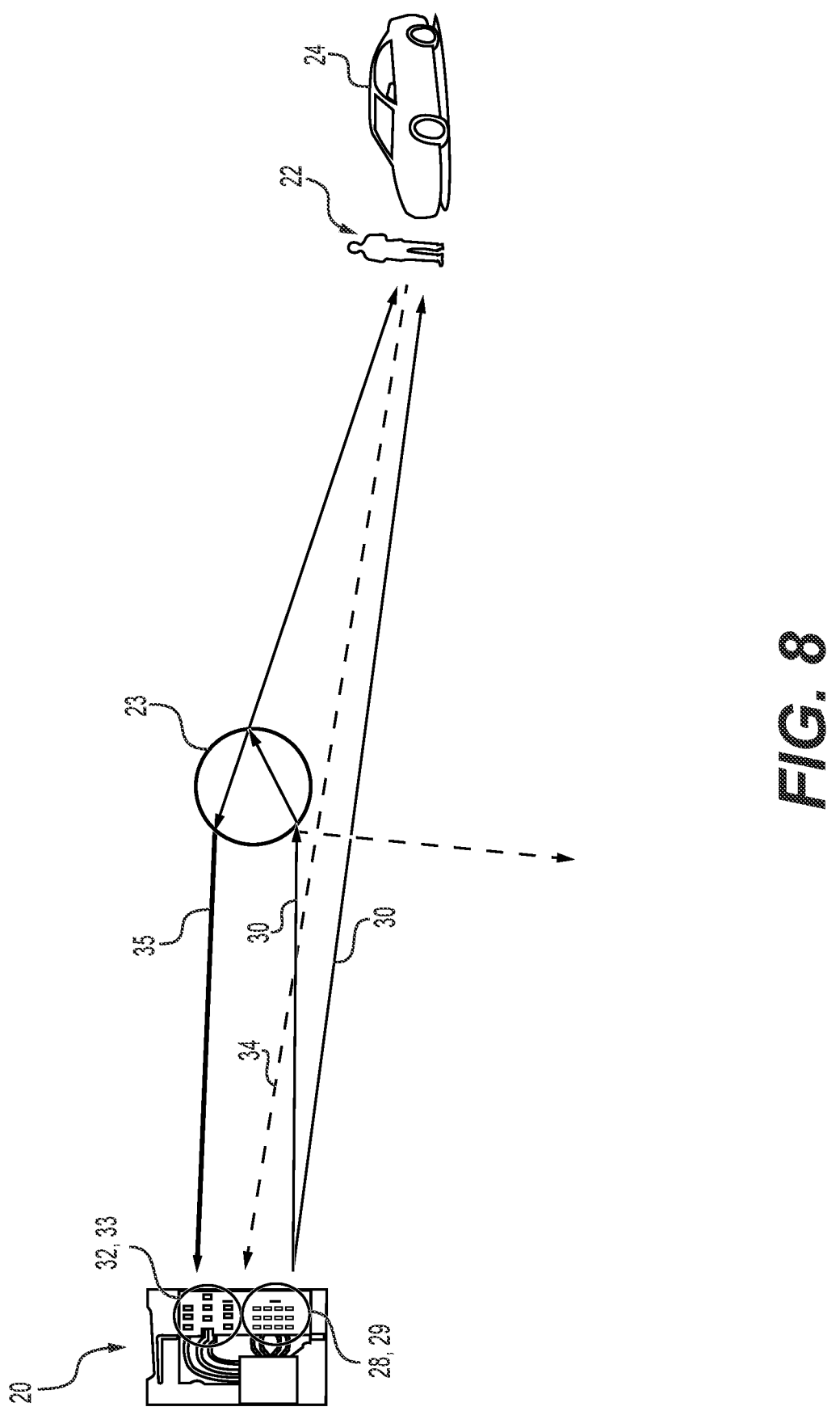
Figure 9:
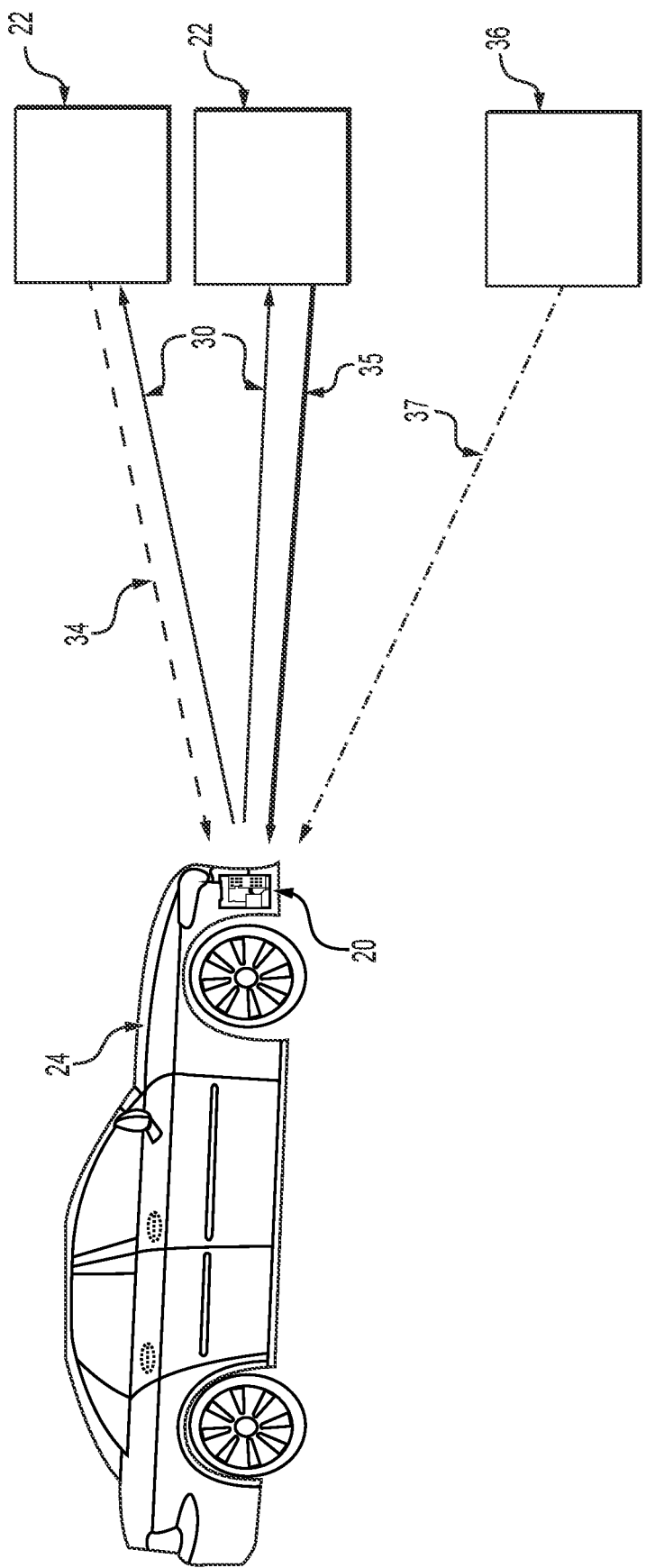
Figure 10:
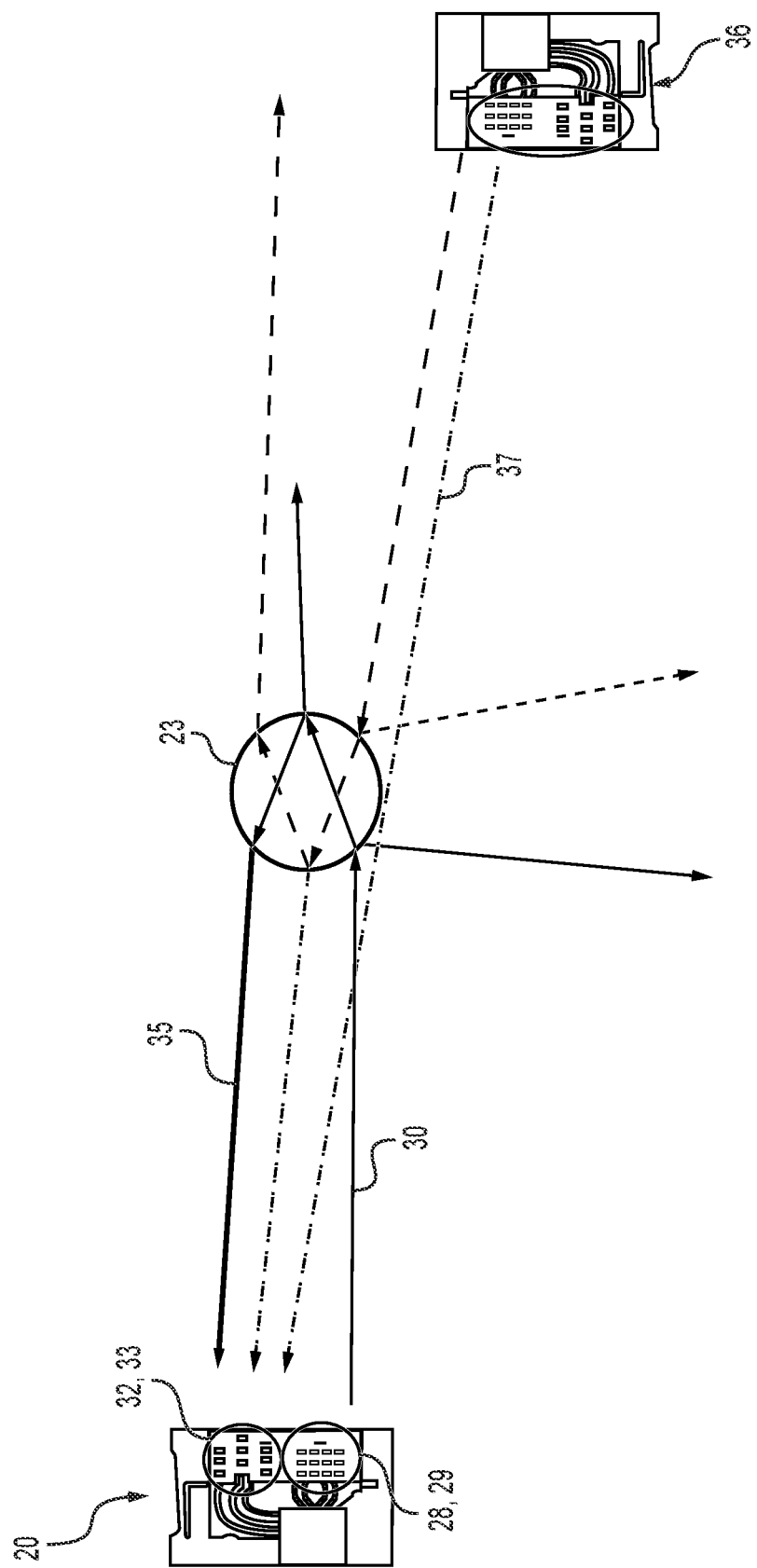
Figure 11A:
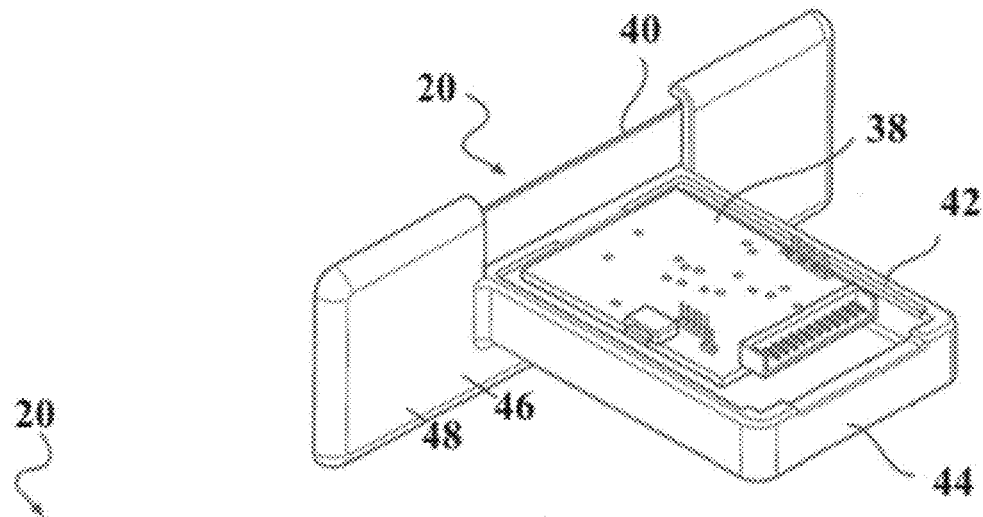
Figure 11B:
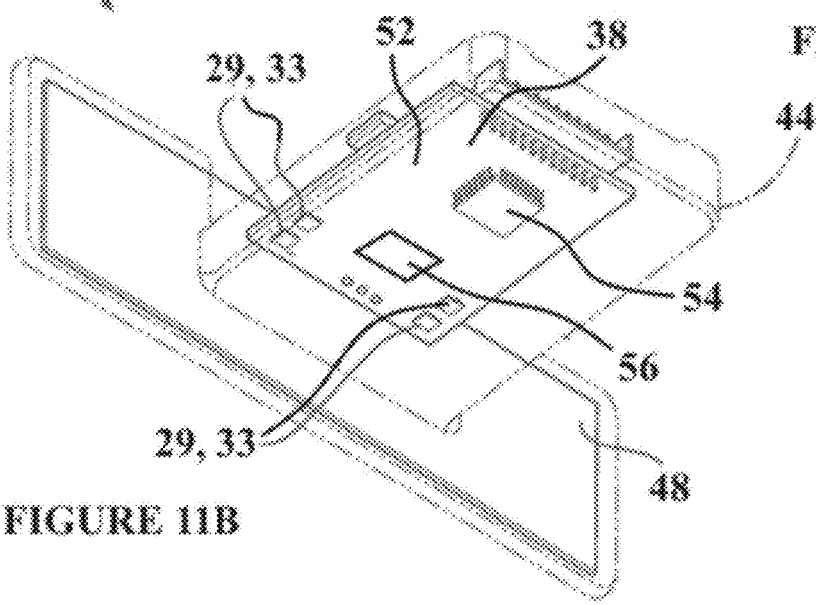
Figure 12:
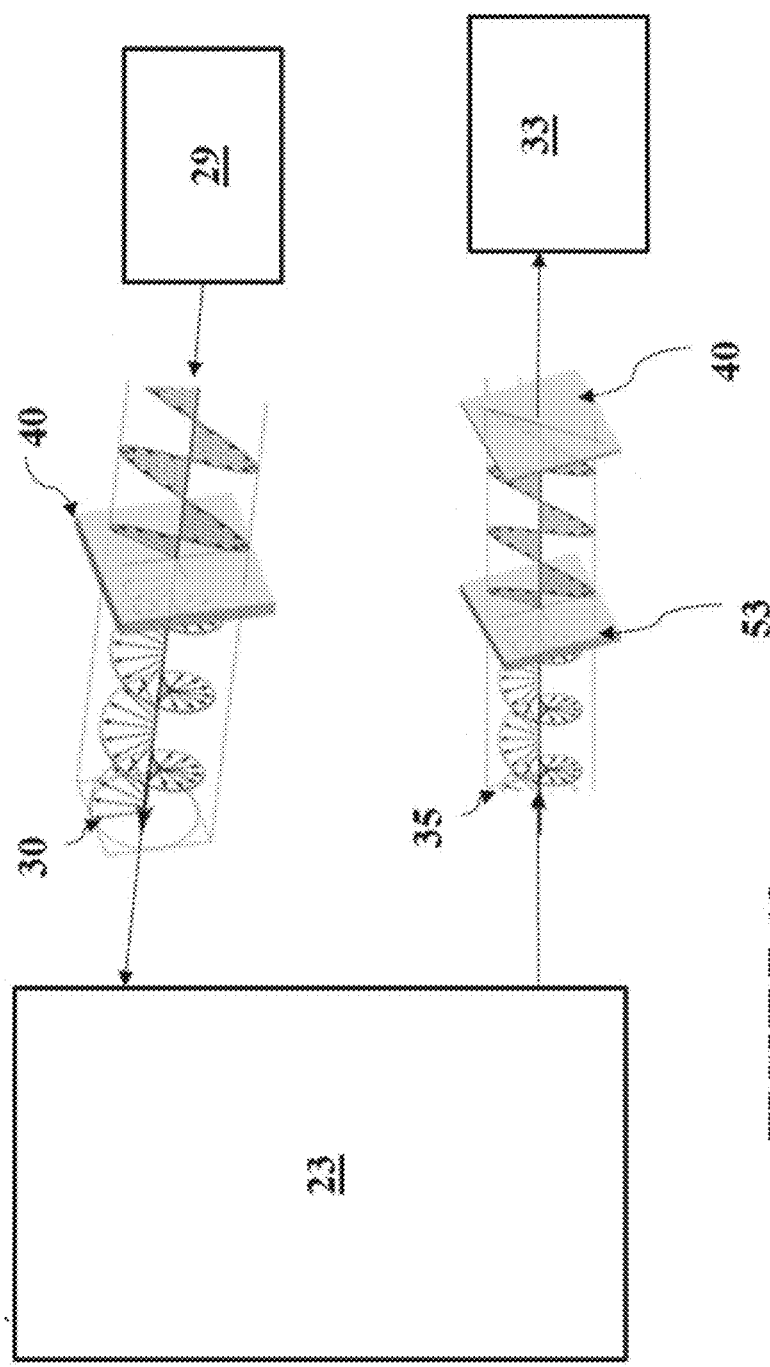
Figure 13:
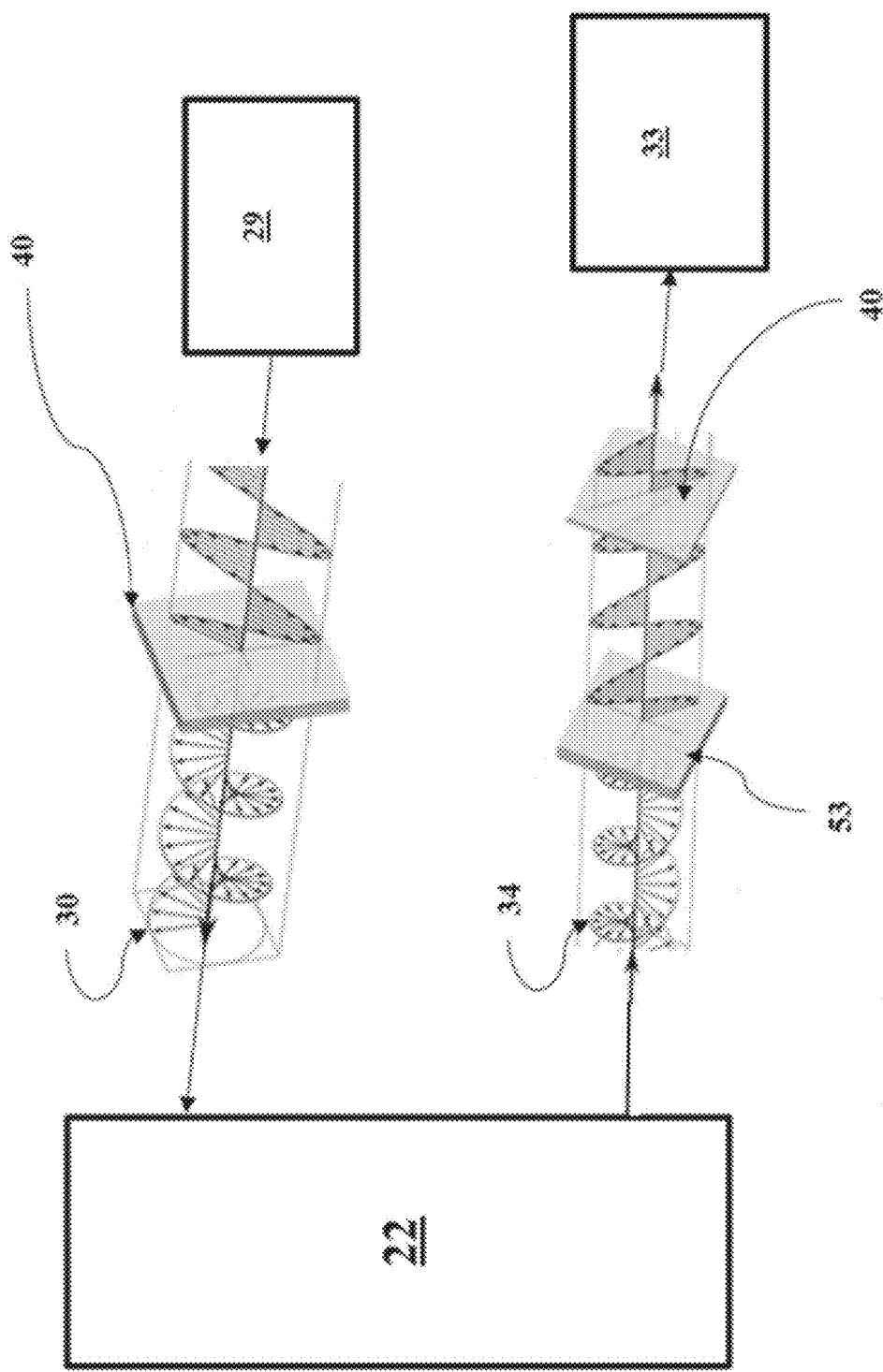
Figure 14:
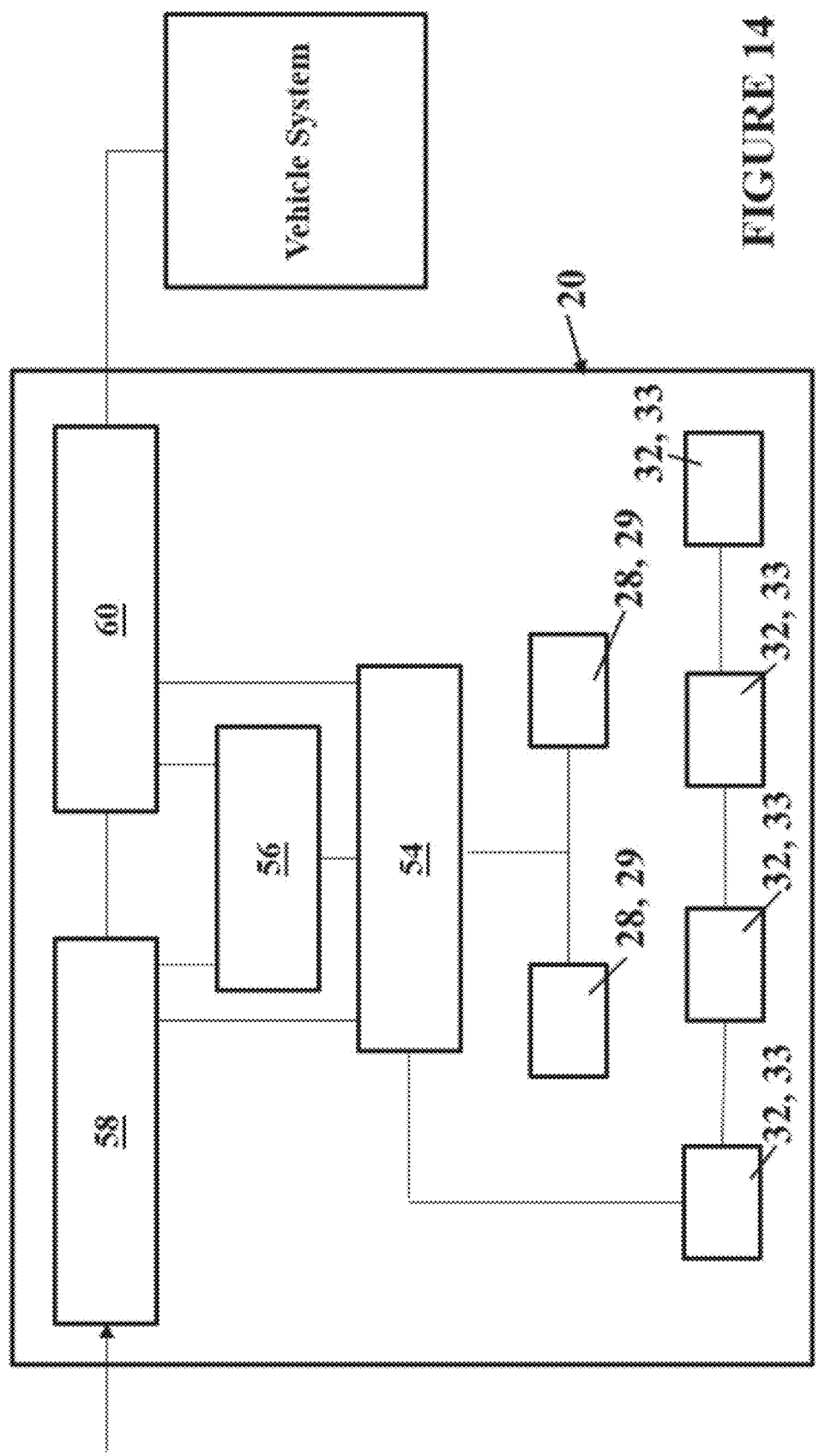
Figure 15:
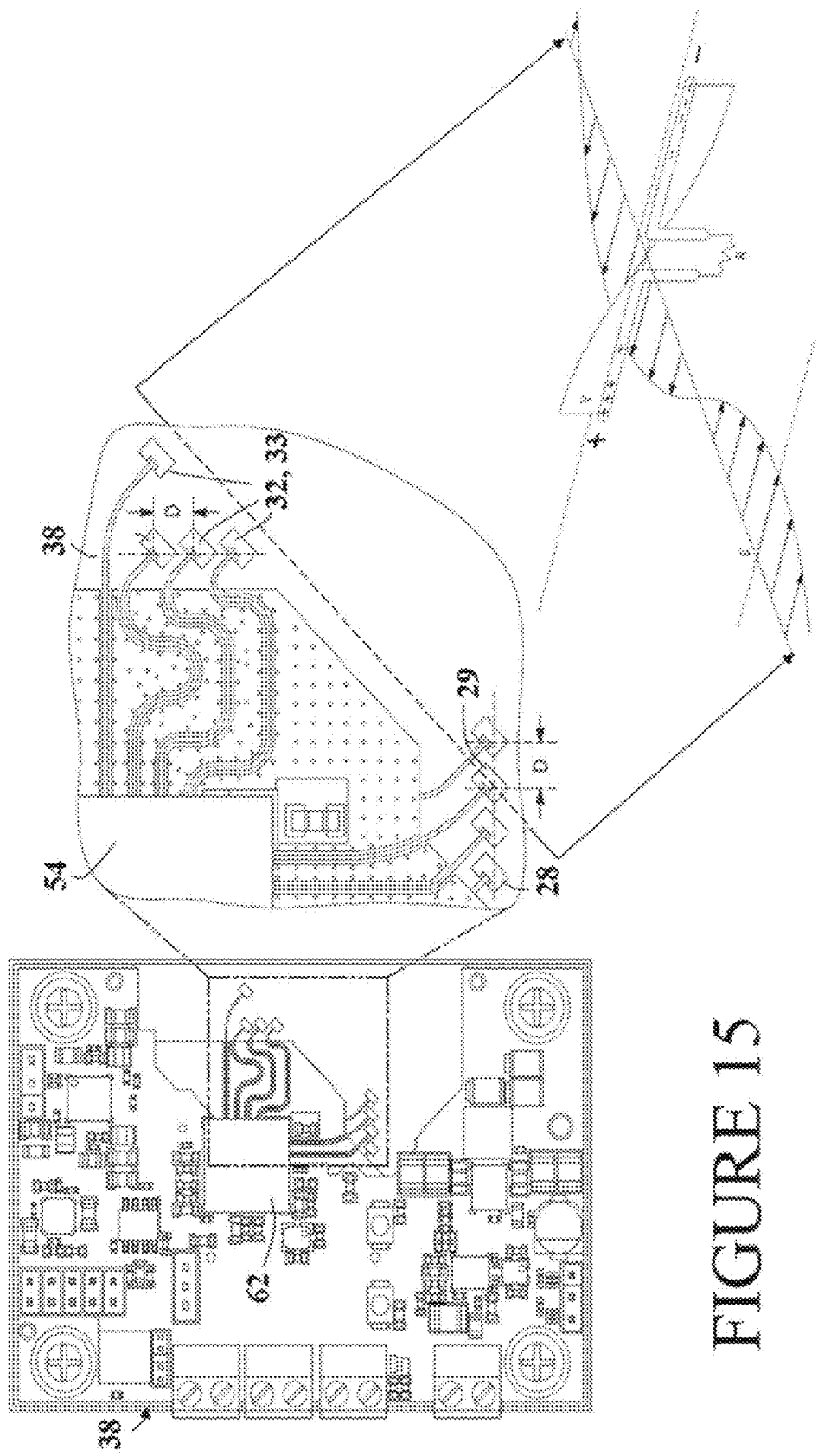
Figure 16:
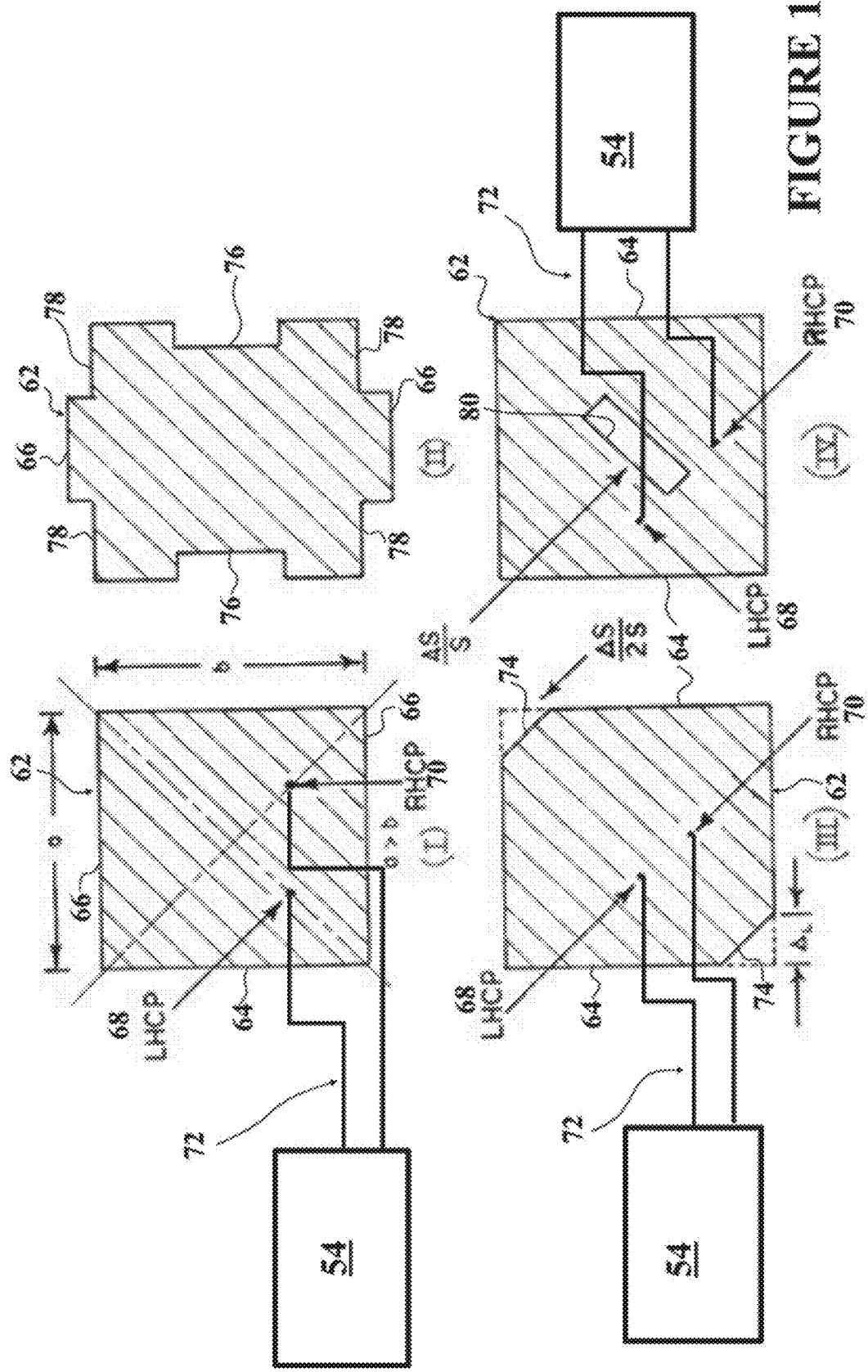
Figure 17:
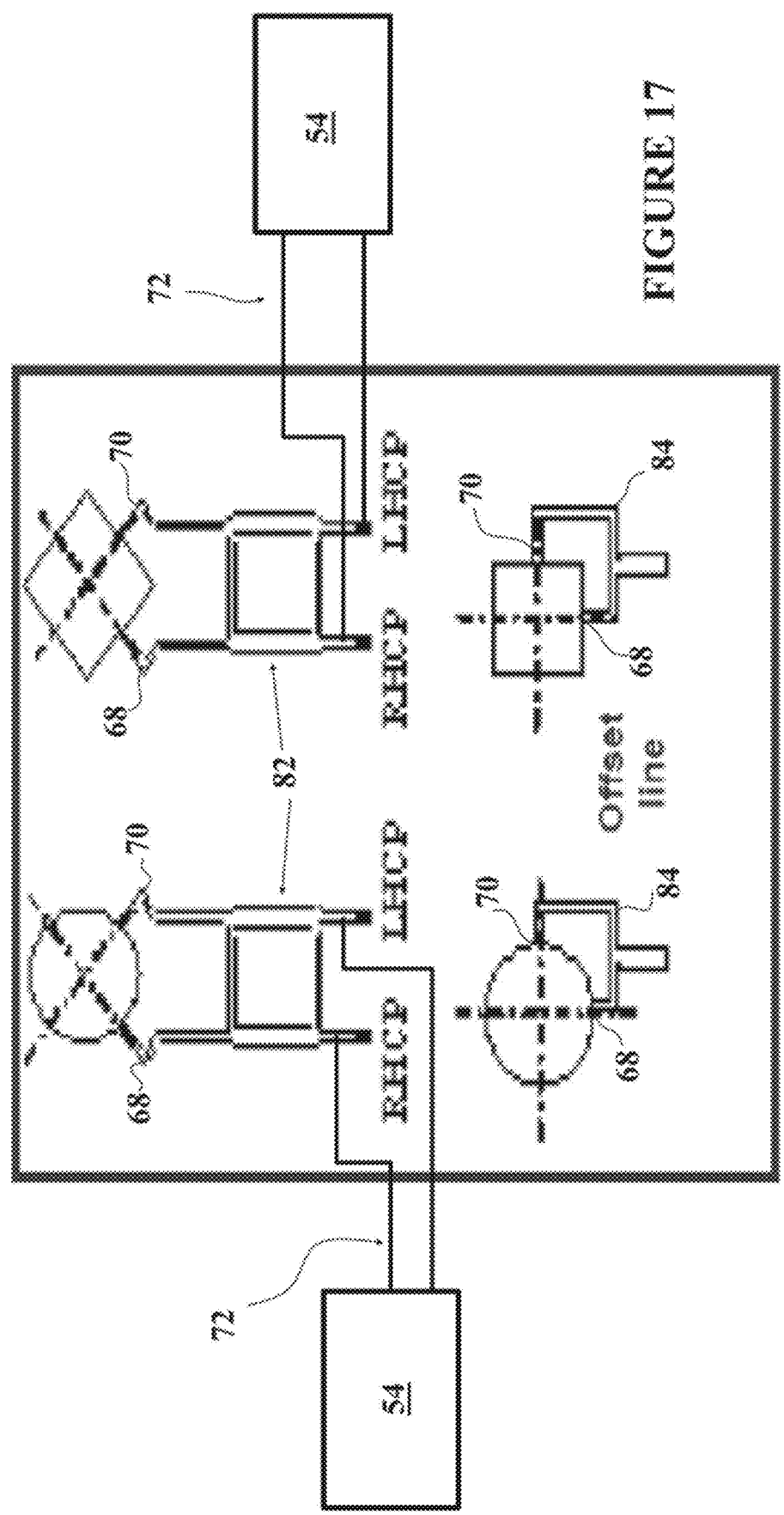
Figure 18:
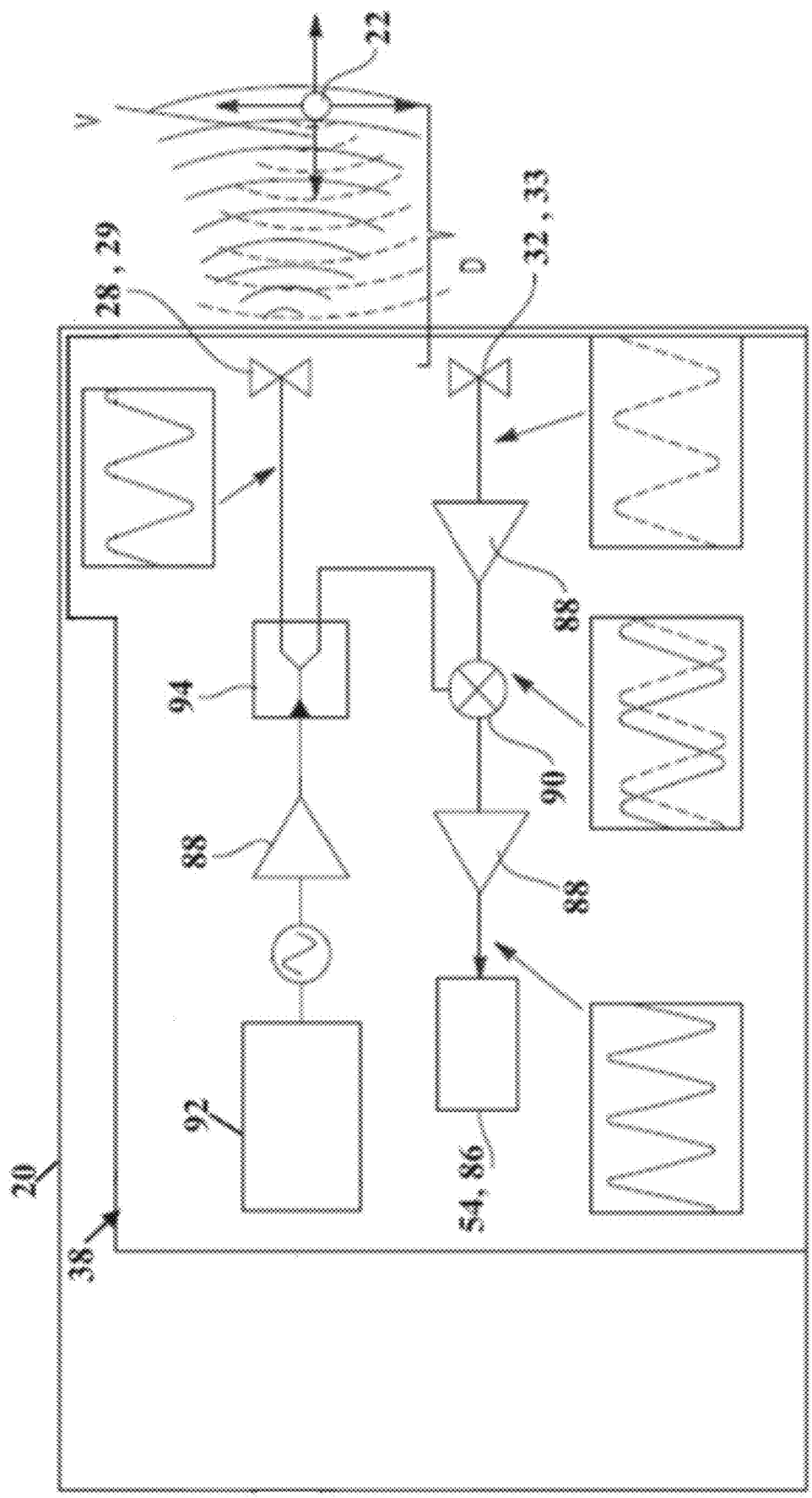
Figure 19:
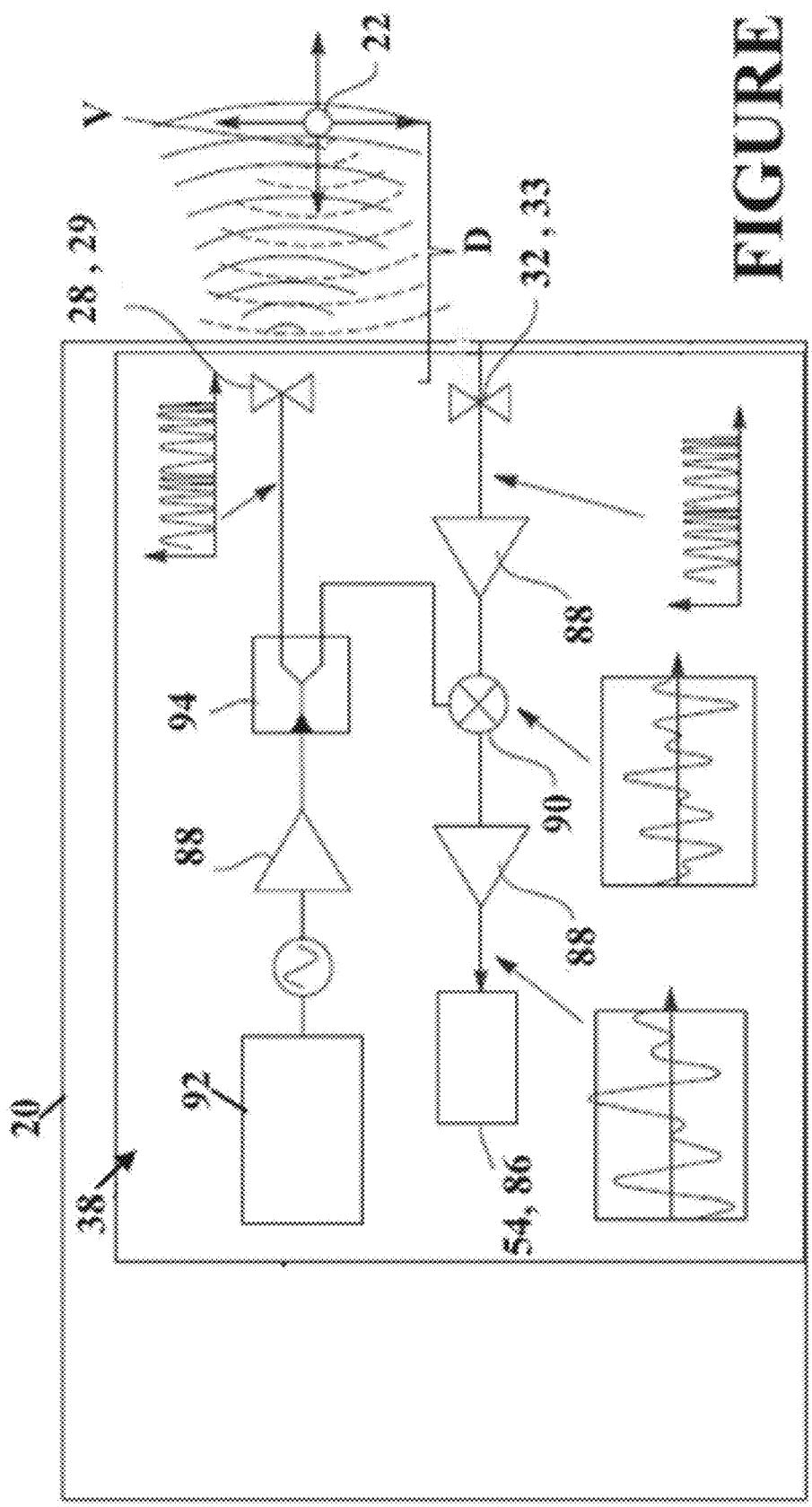
Figure 20:
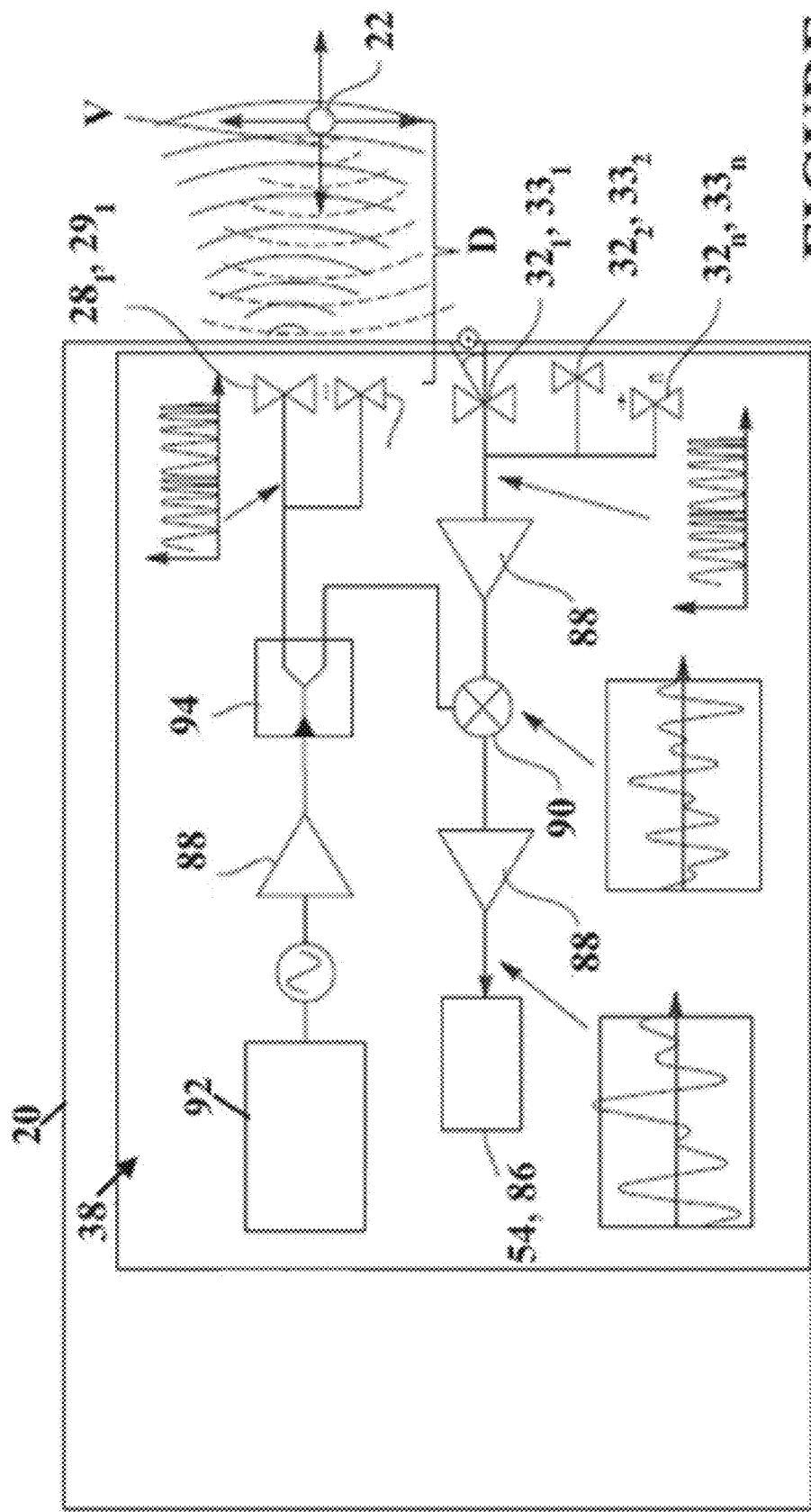
Figure 21:
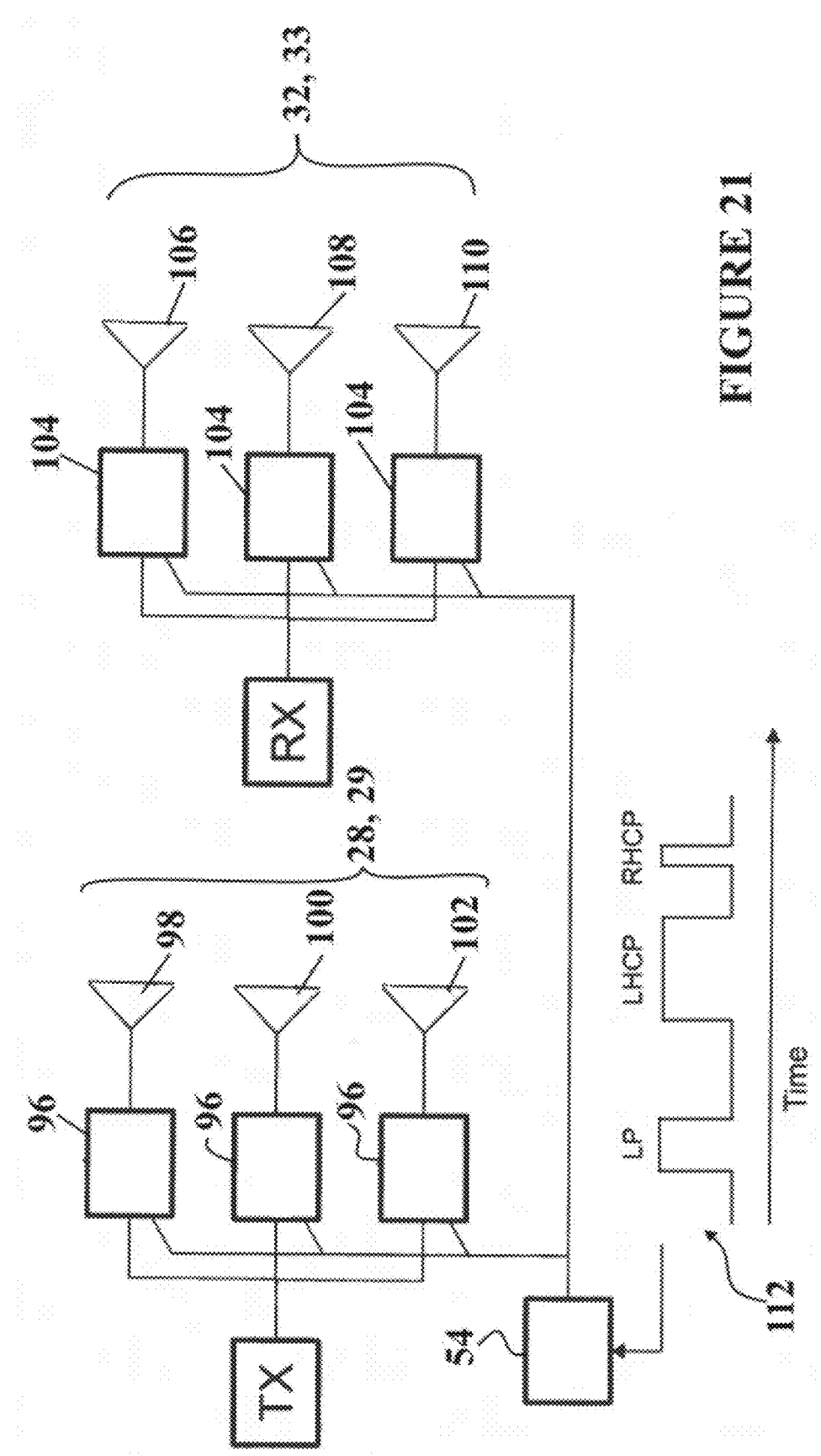
Figure 22:
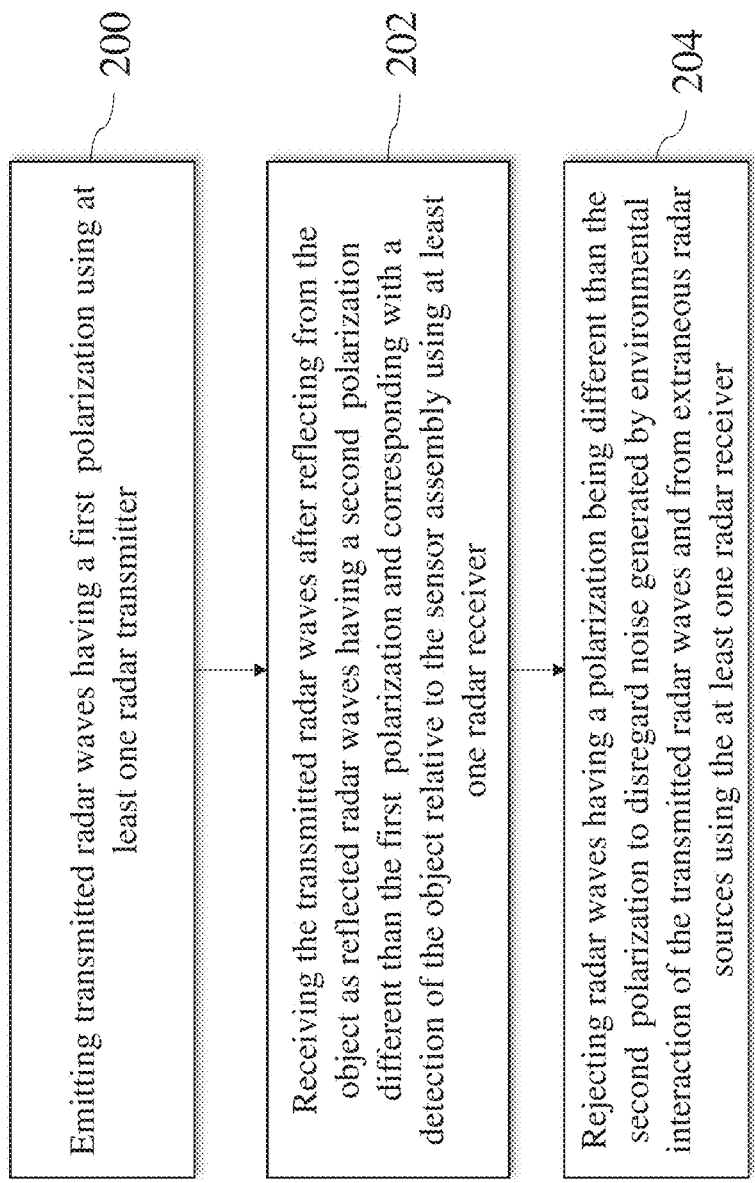

FIGS. 4-6 explain principles regarding interactions of electromagnetic waves with objects causing reflection or refraction affect electromagnetic waves having various polarizations according to aspects of the disclosure;

FIGS. 7 and 8 illustrate the sensor assembly in operation with objects only causing refraction and with objects causing reflection of a left hand circularly polarized radar wave according to aspects of the disclosure;

FIGS. 9 and 10 illustrate the sensor assembly in operation with a third party source transmitting linearly polarized waves while the sensor assembly is emitting a left hand circularly polarized radar wave according to aspects of the disclosure;

FIGS. 11A and 11B illustrate a sensor assembly including a filter cover and lower housing according to aspects of the disclosure;

FIGS. 12 and 13 illustrate operation of a linearly polarized radar transmitter and a linearly polarized radar receiver with the filter cover of FIG. 11 according to aspects of the disclosure;

FIG. 14 is a block diagram of the sensor assembly and illustrates a sensor microprocessor and backlight of the sensor assembly according to aspects of the disclosure;

FIG. 15 illustrates a plurality of radar transmit antennas and a plurality of radar receive antennas for creating polarized radar waves according to aspects of the disclosure;

FIG. 16 illustrates patch antennas that may be used as radar transmit antennas and radar receive antennas according to aspects of the disclosure;

FIG. 17 illustrates a feed networks that may be used with the patch antennas according to aspects of the disclosure;

FIGS. 18-20 are block diagrams illustrating sensor assemblies utilizing radar according to aspects of the disclosure;

FIG. 21 illustrates a sensor assembly including a plurality of transmit encoding switches electrically coupled to radar transmit antennas each configured to transmit the transmitted radar waves with a different respective polarization than another one of the plurality of radar transmit antennas and a plurality of receive decoding switches coupled to radar receive antennas each configured to receive the reflected radar waves with the different respective polarization according to aspects of the disclosure; and FIGS. 22 and 23 illustrate steps of a method of operating a sensor assembly for detecting an object according to aspects of the disclosure.

DETAILED DESCRIPTION

In the following description, details are set forth to provide an understanding of the present disclosure. In some instances, certain circuits, structures, steps, and techniques have not been described or shown in detail in order not to obscure the disclosure.

In general, the present disclosure relates to a sensor assembly of the type well-suited for use in many applications. More specifically, a non-contact sensor assembly capable of detecting objects or users for a motor vehicle is disclosed herein. The sensor assembly of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure.

Figure 1:
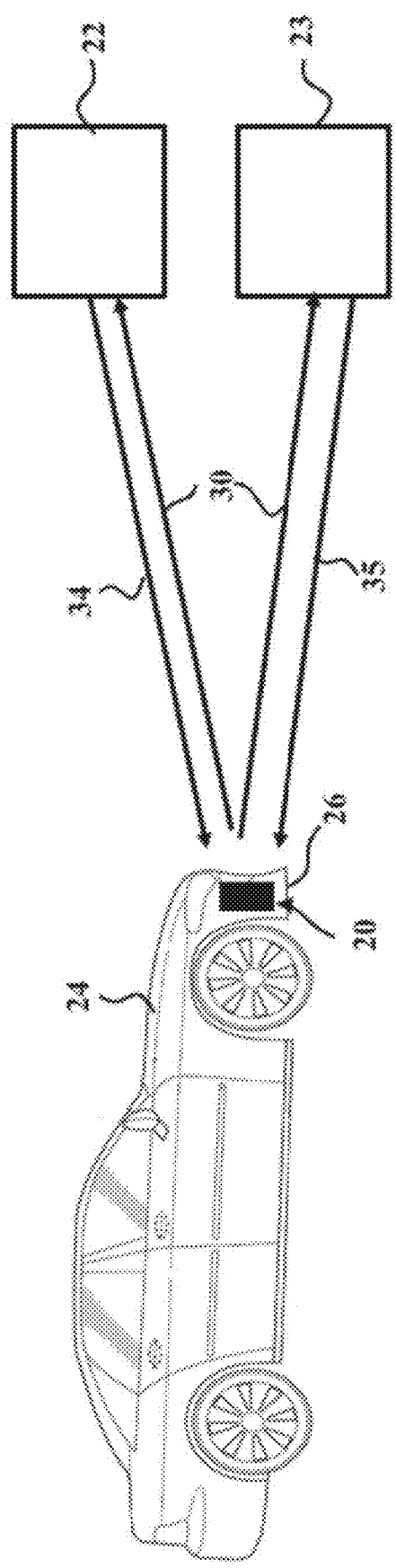
FIG. 1 illustrates a sensor assembly attached to a vehicle according to aspects of the disclosure.

Referring to the Figures, wherein like numerals indicate corresponding parts throughout the several views, a sensor assembly 20 is disclosed for detecting an object 22 while ignoring other radar waves refracted by rain drops 23, for example. The sensor assembly 20 is shown in FIG. 1 to be attached to a vehicle 24 on a front bumper 26 or fascia of the vehicle 24. Such a sensor assembly 20 could, for example, be used for obstacle detection or adaptive cruise control for the vehicle 24 in a forward travel direction. Nevertheless, the sensor assembly 20 could instead be located in various other locations on the vehicle 24 for other non-contact obstacle detection or other vehicle operations (e.g., sensing a gesture or movement to operate power door or lift gate), for instance.

Figure 2:
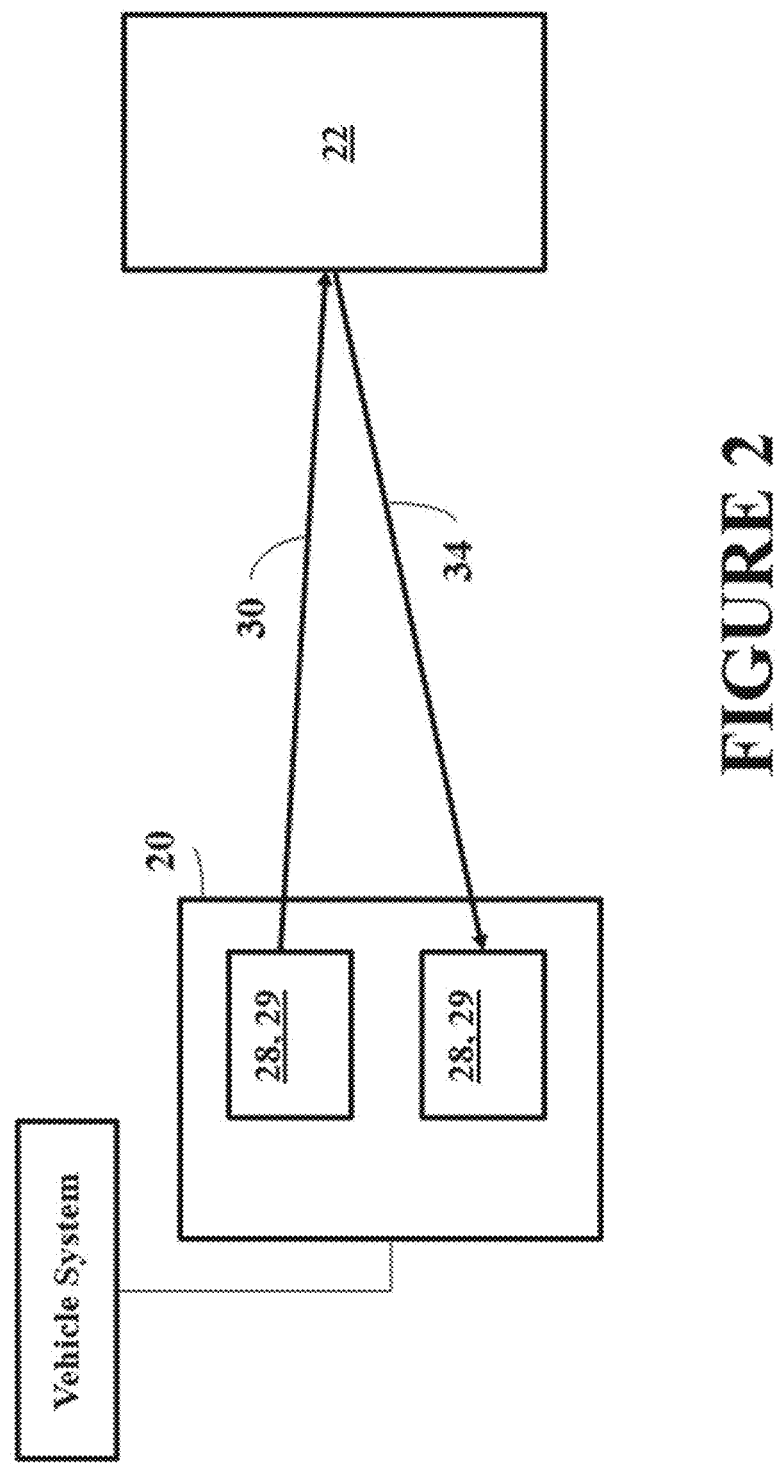
FIG. 2 illustrates the sensor assembly with at least one radar transmitter configured to emit transmitted radar waves having a first polarization and at least one radar receiver configured to receive the transmitted radar waves after reflecting from the object as reflected radar waves having a second polarization different than the first polarization according to aspects of the disclosure.

As best shown in FIG. 2, the sensor assembly 20 includes at least one radar transmitter 28, 29 configured to emit transmitted radar waves 30 having a first polarization. The sensor assembly 20 also includes at least one radar receiver 32, 33 configured to receive the transmitted radar waves 30 after reflecting from the object 22 as reflected radar waves 34 having a second polarization different than the first polarization and corresponding with a detection of the object 22 relative to the sensor assembly 20. The second polarization can, for example, be an inverted form of the first polarization. The at least one radar receiver 32, 33 is additionally configured to reject radar waves having a polarization being different than the second polarization to disregard noise generated by environmental interaction of the transmitted radar waves 30 and from extraneous radar sources. Thus, for example, because refracted radar waves 35 resulting from refraction of the transmitted radar waves 30 due to rain drops 23 or other articles are not inverted forms of the transmitted radar waves 30, they can be rejected by the sensor assembly 20.

According to an aspect, the first polarization of the transmitted radar waves 30 is a left hand circular polarization and the second polarization of the reflected radar waves 34 is a right hand circular polarization. So, the sensor assembly 20 is configured to emit circularly polarized radar waves 30 and receive an inverted transmitted version of the circularly polarized radar waves 34, but reject non-inverted transmitted radar waves 30 (e.g., due to circularly polarized antennas structure or use of a polarizer filter, described in more detail below).

Figure 3:
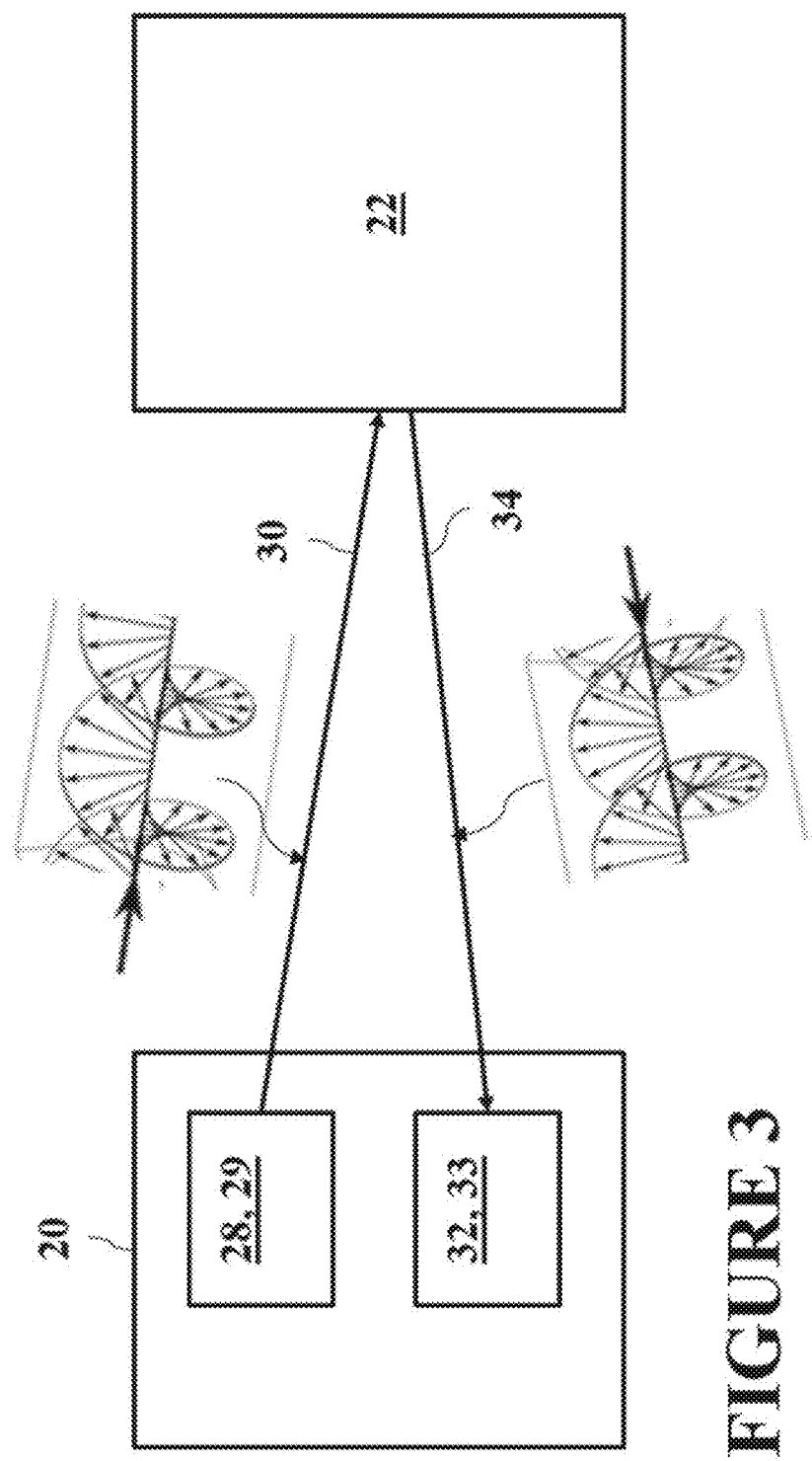
FIG. 3 illustrates the transmitted radar wave being a left hand circularly polarized wave inverted upon reflection from the object to a right hand circularly polarized radar wave according to aspects of the disclosure.

As shown in FIG. 3, the transmitted radar wave 30 is inverted upon reflection from the object 22. Thus, the left hand circularly polarized wave (transmitted radar wave 30) is inverted to a right hand circularly polarized radar wave (reflected radar wave 34). Nevertheless, it should be appreciated that the first polarization of the transmitted radar wave 30 could, for example, be a right hand circular polarization and the second polarization of the reflected radar waves 34 can be a left hand circular polarization. Other polarization, such as, but not limited to elliptical polarization could be similarly employed.

As explained in FIG. 4, when a radio wave (e.g., transmitted radar wave 30) or in fact any electromagnetic wave encounters a change in medium, some or all of it may propagate into the new medium (as a refracted wave, such as refracted radar wave 35) and the remainder is reflected. The part of the radio wave that enters the new medium is the transmitted wave (e.g., transmitted radar wave 30) and the other part is the reflected wave (e.g., reflected radar wave 34). The reflected wave is inverted at a boundary B with greater index of refraction, but the transmitted wave is not inverted at the boundary B with greater index of refraction when refracted.

As shown in FIG. 5, when a linearly polarized wave reflects from the boundary B of higher index of refraction, the phase shifts by 180 degrees. Refracted waves (e.g., refracted radar waves 35), however, do not exhibit a phase shift. Reflected linearly polarized waves (e.g., reflected radar waves 34) have the same polarization as the incident wave (e.g., transmitted radar waves 30)—the phase shift does not change polarization, but for circularly polarized waves, reflected circularly polarized light changes handedness. In other words, for a linearly polarized wave, the "inversion" is the inversion of the phase. For circularly polarized waves or elliptically polarized waves, the inversion is of the "handedness". Any electromagnetic wave, such as ultraviolet, visible light, infrared, radar waves 30, 34, 35 behave as illustrated in FIG. 6 when the wavelength of the electromagnetic wave is to be equal or smaller than the size of the sphere (e.g., water droplet or rain drop 23). As shown, an incident ray has an angle of incidence i at the point A. Within the sphere, r is an angle of refraction and outside the sphere, d is an angle by which the electromagnetic wave has been deviated (at point D), so that the outgoing electromagnetic wave exits the sphere at point C with the angle i as shown. Thus, the angle AOB is equal to 180-2r, the angle DAO is equal to i, the angle ADO is equal to 180-(180-2r)-i or 2r-i, and the angle CDO is equal to the angle of ADO. Consequently, the deviation angle d equals 180-ADO-CDO or 180-4r+2i.

Generally, in radar sensors utilizing radar transmitters and radar receivers configured to receive inverted linearly polarized transmitted waves, the radar receivers will not reject non-inverted transmitted waves and thus cannot differentiate between radar waves which are reflected or refracted. As discussed, solid objects 22 will reflect radar waves; however, water, such as in the form of rain (e.g., rain drop 23), ice, or snow will refract the radar waves in a manner as described herein above. Therefore, refraction of radar waves can produce false signals and thus noise which prior art radar sensors and/or associated systems have to process using complex algorithms and computing power.

Thus, referring back to FIG. 3, because the at least one radar receiver 32, 33 is configured to receive the transmitted radar waves 30 (e.g., left hand circularly polarized radar wave) after reflecting from the object 22 (true detected object 22) as reflected radar waves 34 having a second polarization (e.g., right hand circularly polarized radar wave), the at least one radar receiver 32, 33 receives the reflected radar waves 34 indicative of a true detected object 22, such as a solid object or one which can reflect electromagnetic waves. The at least one radar receiver 32, 33 also is configured to not receive (i.e., reject) radar waves having the first polarization (e.g., left hand circularly polarized radar wave), for example.

Thus, as shown in FIG. 7, rain drop 23 causes refraction of the transmitted radar wave 30 (e.g., refracted radar wave 35), and so the transmitted radar wave 30 is not inverted and is rejected by the at least one radar receiver 32, 33. So, in operation, shown in FIG. 8, the at least one radar transmitter 28, 29 emits the transmitted radar waves 30 and the reflected radar waves 34 from the vehicle 24 or person/object 22 are received by the at least one radar receiver 32, 33, while the refracted radar waves 35 from the rain drop 23 are not received by the at least one radar receiver 32, 33, thereby avoiding additional processing of the reflected radar waves 34 using complex algorithms and computing power.

Also, as shown in FIG. 9, transmitted linearly polarized waves 37 from a third party source 36 (e.g., another vehicle 24), can be inverted or not-inverted during transmission through the environment and such electromagnetic waves are noise to the at least one radar receiver 32, 33 of the sensor assembly 20. Thus, the sensor assembly 20 disclosed herein can reduce effects of environmental noise caused by linearly polarized third party sources 36 of electromagnetic waves, as the at least one radar receiver does not receive such electromagnetic waves 37 (they do not have the second polarization). As a result, the sensor assembly 20 disclosed herein can improve the signal to noise ratio (SNR) in radar dispersive environments. So, in operation, shown in FIG. 10, the at least one radar transmitter 28, 29 emits the transmitted radar waves 30 and an extraneous or third party source 36 emits linearly polarized radar waves; however, the linearly polarized radar waves from the third party source 36 and refracted radar waves from the rain drop 23 are not received by the at least one radar receiver 32, 33.

As illustrated in FIGS. 11A and 11B, the sensor assembly 20 includes a sensor printed circuit board 38 and the at least one radar transmitter 28, 29 (e.g., linearly polarized radar transmitter 29) and the at least one radar receiver 32, 33 (e.g., linearly polarized radar receiver 33) are disposed on the sensor printed circuit board 38 and electrically connected thereto. According to an aspect, the first polarization is linear polarization and the sensor assembly 20 further includes a filter cover 40 disposed adjacent to and covering the at least one radar transmitter 28, 29 and configured to circularly polarize the transmitted radar waves 30 while reflecting visible light (e.g., dielectric mirror), thereby concealing the at least one radar transmitter 28, 29. Thus, a filter arrangement (e.g., the filter cover 40) can be provided in front of the linearly polarized antenna structure as an alternative to utilizing antennas configured to transmit circularly polarized radar waves 30. The sensor assembly 20 can also include a lower housing 42 of plastic defining a closed end 44 and an open end 46 and including a cover flange 48 extending outwardly from the lower housing 42 at the open end 46 and configured to engage and support the filter cover 40 transversely over the open end 46 and an upper housing (not shown) of plastic coupled to the lower housing 42 to define a sensor chamber 52 enclosing the sensor printed circuit board 38.

Referring to FIGS. 12 and 13, the filter cover 40 can act to circularly polarize the transmitted radar waves 30, so that if no inversion occurs (article like rain drop 23 causing refraction), the linear polarized radar wave axis (of the refracted waves) is offset by ninety (90) degrees relative to the axis of the filter cover 40. Therefore, in FIG. 12, the refracted radar wave 35 is blocked by the filter cover 40 and no radar waves passes through to the at least one radar receiver 32, 33 (e.g., linearly polarized radar receiver 33). The filter cover 40 can also conceal the at least one radar receiver 32, 33. A linear polarizer with a quarter wave plate 53 can polarize the reflected radar waves 34, which, for example, are inverted from left hand circular polarized transmitted waves 30 to right hand circularly polarized reflected radar waves 34 after reflection from the object 22 before reaching filter cover 40. So, with an object 22 causing reflection of the transmitted radar wave 30, the linear polarized radar wave axis (of the reflected radar waves 34) is (0) degrees to the axis of the filter cover 40 (e.g., linear polarizer), therefore it is allowed to pass through the filter cover 40 and the reflected waves can pass through to the at least one radar receiver 32, 33, as shown in FIG. 13.

As best shown in FIGS. 14 and 15, the sensor assembly 20 also includes a sensor microprocessor 54 disposed on and electrically coupled to the sensor printed circuit board 38. The sensor microprocessor 54 is also electrically coupled to the at least one radar transmitter 28, 29 and the at least one radar receiver 32, 33. The sensor microprocessor 54 is configured to control emission of the transmitted radar waves 30 using the at least one radar transmitter 28 and detect of the object 22 relative to the sensor assembly 20 using the at least one radar receiver 32, 33. The direction of a radar wave polarization plane can be perpendicular to an antenna plane as shown, for example, by the diagonal line in FIG. 15 between the at least one radar transmitter 28, 29 and the at least one radar receiver 32, 33. According to an aspect, the at least one radar transmitter 28, 29 includes a plurality of radar transmit antennas 28, 29 (e.g., left hand circularly polarized radar transmit antennas 28) electrically coupled to the sensor microprocessor 54 and the at least one radar receiver 32, 33 includes a plurality of radar receive antennas 32, 33 (e.g., right hand circularly polarized radar receive antennas 32) electrically coupled to the sensor microprocessor 54.

Referring specifically to FIG. 14, the sensor assembly 20 can also include a backlight 56 (also shown in FIG. 11B) electrically coupled to and controlled by the sensor microprocessor 54. The backlight 56 can, for example, be disposed adjacent the at least one radar transmitter 28, 29. The backlight 56 is configured to generate light outwardly through the filter cover 40 to further conceal the at least one radar transmitter 28, 29.

The sensor assembly 20 may also include a power supply circuit 58 electrically coupled to the sensor microprocessor 54 and for coupling with a power source. A communication circuit 60 may also be electrically coupled to the sensor microprocessor 54 and can be utilized by the sensor assembly 20 to communicate with other electronic modules or main non-contact obstacle detection system control unit over a controller area network (CAN) or local interconnect network (LIN) bus, for example.

As illustrated in FIG. 16, each of the plurality of radar transmit antennas 28, 29 (e.g., left hand circularly polarized radar transmit antennas 28) and each of the plurality of radar receive antennas 32, 33 (e.g., right hand circularly polarized radar receive antennas 32), for example, as part of the at least one radar transmitter 28, 29 and/or the at least one radar receiver 32, 33 can comprise a patch antenna 62. The patch antenna 62 may have a rectangular shape including a pair of longitudinal sides 64 of a first length b being parallel and spaced from one another and a pair of lateral sides 66 of a second length a being parallel and spaced from one another and extending between the pair of longitudinal sides 64 and a first feed 68 and a second feed 70 for each coupling to one of a pair of excitation lines 72. In order to produce or receive the circularly polarized radar waves 30, 34, the patch antenna 62 can define a pair of truncated corners 74 disposed diagonally opposite one another. Alternatively, the patch antenna 62 can define a plurality of perturbations formed as at least one longitudinal notch 76 along each of the pair of longitudinal sides 64 and a plurality of lateral notches 78 each of the pair of lateral sides 66. As another alternative, the patch antenna 62 can instead define a rectangular slot 80 extending therethrough and diagonally across the patch antenna 62.

As best shown in FIG. 17, the sensor assembly 20 can further include a feed network 82, 84 configured to electrically couple to the first feed 68 and the second feed 70 and a remainder of the at least one radar transmitter 28 and/or the at least one radar receiver 32 (e.g., wave generator, oscillator, amplifiers, discussed in more detail below). Specifically, the feed network 82, 84 can comprise either a hybrid coupler 82 coupled to the first feed 68 and the second feed 70 and an offset coupler 84 coupled to the first feed 68 and the second feed 70; however, other configurations are contemplated.

With reference to FIGS. 18-20, the sensor assembly 20 can be configured to emit continuously modulated radiation, ultra-wideband radiation, or sub-millimeter-frequency radiation (e.g., frequencies forming part of the ISM frequency band about 24 GHz, or the 60 GHz frequency band as examples, but other ranges are also contemplated). For example, the sensor assembly 20 may be configured to emit continuously emitted radiation by the radar transmitting antenna 28, 29, or continuous wave (CW) radar, known in the art to use Doppler radar techniques, which can be employed by the sensor assembly 20 for radar based obstacle or gesture recognition as illustrated in FIG. 18. A radar transmit antenna 28, 29 used for frequency modulated continuous wave (FMCW) radar, also known in the art to use Doppler radar techniques, may also be employed in the sensor assembly 20 as illustrated in FIG. 19. Also, the sensor assembly 20 may be configured for pulsed time-of-flight radar. As shown, the sensor assembly 20 can include one or more radar receiving antennas 32, 33, for receiving the reflections of the transmitted radar waves 30, which reflect off of the object 22 or a user. The radar receiving antennas 32, 33 may be integrated into the sensor printed circuit board 38, or integrated into a radar chip affixed to the sensor printed circuit board 38.

So, the sensor assembly 20 may be configured to emit and detect continuous wave (CW) radar, as is illustratively shown in FIG. 18 with the sensor assembly 20 including one transmit antenna 28, 29 and one receive antenna 32, 33. With such a configuration, the sensor assembly 20 is operable to detect a speed/velocity V of the object 22/user using the Doppler Radar principles (i.e., processing by the sensor microprocessor 54 or a dedicated local application specific radar signal processor 86 of the received reflected CW radar signal to determine frequency shifts of an emitted continuous radiation wave indicative of the speed V of the object 22 or user). The radar transmitting antenna 28, 29 can be also configured to emit frequency modulated continuous wave (FMCVV) radar, as is illustratively shown in FIG. 19, with the sensor assembly 20 including one transmit antenna 28, 29 and one receive antenna 32, 33. With such a configuration, the sensor assembly 20 is operable to detect a gesture/motion of the obstacle/user using the Frequency Modulated Radar techniques (i.e., processing by the application specific radar signal processor 86 or sensor microprocessor 54 of the reflected FMCW radar signal to determine frequency shifts indicative of the speed V (Doppler frequency) and distance D (beat frequency) of the object 22/user). Alternatively the FMCW radar system can be configured to include at least two receive antennas $32_1$, $32_2$ to $32_n$ (or alternatively $33_1$, $33_2$ to $33_n$) forming an antenna array, as shown in FIG. 20. Also, multiple transmit antennas $28_n$ (or alternatively $29_n$) may be provided. The signal processor 86 is illustrated disposed in communication with the antenna element(s) $28_n$, $29_n$, $33_1$, $33_2$ to $33_n$ through signal processing elements such as high/low gain signal amplifiers 88, a mixer 90 configured to mix the received signal with the transmitted signal generated by a waveform generator 92 as received from a splitter 94 for processing the received reflections (i.e., the signal processor 86 or sensor microprocessor 54 can be configured execute instructions stored in a memory to perform calculations on the received reflection and transmitted radiation signals (i.e., mixed signals) to implement the various detection techniques or algorithms e.g., CW Radar, FMCW Radar, time of flight) within the intermediate radar field to provide data for determining the movement of the object 22. For example, the signal processor 86 or sensor microprocessor 54 can be configured to process the received reflection to determine a Doppler shift for calculating the speed/velocity V of the object 22 or user, or a frequency shift for calculating the distance D and speed V of the object 22 or user.

According to another aspect and as best shown in FIG. 21, the at least one radar transmitter 28, 29 includes a plurality of transmit encoding switches 96 electrically coupled to and controlled by the sensor microprocessor 54. Each of the plurality of transmit encoding switches 96 is coupled to one of the plurality of radar transmit antennas 28, 29. Each of the plurality of radar transmit antennas 28, 29 is configured to transmit the transmitted radar waves 30 with a different respective polarization than another one of the plurality of radar transmit antennas 28, 29. Specifically, the plurality of radar transmit antennas 28, 29 includes at least one linearly polarized transmit antenna 98 and at least one left hand circularly polarized transmit antenna 100 and at least one right hand circularly polarized transmit antenna 102. Other sub-combinations are possible.

In addition, the at least one radar receiver 32, 33 includes a plurality of receive decoding switches 104 electrically coupled to and controlled by the sensor microprocessor 54. Each of the plurality of receive decoding switches 104 is coupled to one of the plurality of radar receive antennas 32, 33. Each of the plurality of radar receive antennas 32, 33 is configured to receive the reflected radar waves 34 with the different respective polarization. In more detail, the plurality of radar receive antennas 32, 33 includes at least one linearly polarized receive antenna 106 (e.g., horizontal linear polarization or vertical linear polarization) and at least one left hand circularly polarized receive antenna 108 and at least one right hand circularly polarized receive antenna 110. Other sub-combinations are possible.

Consequently, the sensor microprocessor 54 is configured to control the plurality of transmit encoding switches 96 to modulate a radar signature 112 comprised of sequential transmissions by each of the plurality of radar transmit antennas 28, 29 with the different respective polarization. Similarly, the sensor microprocessor 54 is also configured to control the plurality of receive decoding switches 104 to receive the reflected radar signature 112. So, the sensor assembly 20 can dynamically modulate between polarization states.

As best shown in FIGS. 22 and 23, a method of operating a sensor assembly 20 for detecting an object 22 is also disclosed. The method includes the step of 200 emitting transmitted radar waves 30 having a first polarization using at least one radar transmitter 28, 29. The method can continue by 202 receiving the transmitted radar waves 30 after reflecting from the object 22 as reflected radar waves 34 having a second polarization different than the first polarization and corresponding with a detection of the object 22 relative to the sensor assembly 20 using at least one radar receiver 32, 33. The method can also include the step of 204 rejecting radar waves 30, 34 having a polarization being different than the second polarization to disregard noise generated by environmental interaction of the transmitted radar waves 30 and from extraneous radar sources using the at least one radar receiver 32, 33.

According to an aspect, the method of operating a sensor assembly 20 for detecting an object 22, can be carried out on the sensor assembly 20 shown in FIG. 21 and discussed above. Thus, the method can include the step of 206 controlling a plurality of transmit encoding switches 96 each coupled to one of a plurality of radar transmit antennas 28, 29 being configured to transmit the transmitted radar waves 30 with a different respective polarization than another one of the plurality of radar transmit antennas 28 to modulate a radar signature 112 comprised of sequential transmissions by each of the plurality of radar transmit antennas 28, 29 with the different respective polarization. The method can also include the step of 208 controlling a plurality of receive decoding switches 104 each coupled to one of a plurality of radar receive antennas 32, 33 being configured to receive the reflected radar waves 34 with the different respective polarization to receive the reflected radar signature 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the sensor assembly 20 can likewise be implemented into many other systems to control one or more operations and/or functions, such as an obstacle detection system for detecting an object adjacent a power operated actuator, such as for example that shown in co-owned US patent No. US20170306684 entitled "Non-contact obstacle detection system for motor vehicles", the entire contents of which are incorporated herein by reference, and a gesture detection system such as shown and described in commonly owned US patent No. US20180238099, entitled "Power swing door with virtual handle gesture control", the entire contents of which are incorporated herein by reference.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A sensor assembly for detecting an object comprising:
   at least one radar transmitter configured to emit transmitted radar waves having a first polarization, the at least one radar transmitter including a plurality of transmit encoding switches each coupled to one of a plurality of radar transmit antennas, each of the plurality of radar transmit antennas is configured to transmit the transmitted radar waves with a different respective polarization than another one of the plurality of radar transmit antennas;
   at least one radar receiver configured to:
      receive the transmitted radar waves after reflecting from the object as reflected radar waves having a second polarization different than the first polarization and corresponding with a detection of the object relative to the sensor assembly, and
      reject radar waves having a polarization being different than the second polarization to disregard noise generated by environmental interaction of the transmitted radar waves and from extraneous radar sources;
   the at least one radar receiver including a plurality of receive decoding switches each coupled to one of a plurality of radar receive antennas, each of the plurality of radar receive antennas is configured to receive the reflected radar waves with the different respective polarization; and
   a sensor microprocessor configured to:
      control emission of the transmitted radar waves using the at least one radar transmitter,
      control the plurality of transmit encoding switches to modulate a radar signature comprised of sequential transmissions by each of the plurality of radar transmit antennas with the different respective polarization,
      control the plurality of receive decoding switches to receive the reflected radar signature, and
      detect of the object relative to the sensor assembly using the at least one radar receiver.

2. The sensor assembly as set forth in claim 1, wherein the at least one radar receiver is configured to accept the radar waves having a polarization having the second polarization for the detection of the object generated by interaction of the transmitted radar waves with the object causing an alteration in the first polarization of the transmitted radar waves.

3. The sensor assembly as set forth in claim 1, further including a sensor printed circuit board and wherein the at least one radar transmitter and the at least one radar receiver are disposed on the sensor printed circuit board and electrically connected thereto, wherein the at least one radar transmitter includes at least one polarized transmit antenna configured to generate the transmitted radar waves having a circular polarization of a first direction and the at least one radar receiver includes at least one polarized receive antenna configured to receive the reflected radar waves having a circular polarization of a second direction.

4. The sensor assembly as set forth in claim 1, wherein the first polarization is a linear polarization and the sensor assembly further includes a filter cover disposed adjacent to and covering the at least one radar transmitter and configured to circularly polarize the transmitted radar waves.

5. The sensor assembly as set forth in claim 3, wherein the circular polarization of a first direction is one of a right-handed polarization and a left-handed polarization and the circular polarization of the second direction is the other one of the right-handed polarization and the left-handed polarization.

6. The sensor assembly as set forth in claim 1, wherein the at least one radar transmitter includes a plurality of radar transmit antennas electrically coupled to the sensor microprocessor and the at least one radar receiver includes a plurality of radar receive antennas electrically coupled to the sensor microprocessor, and wherein each of the plurality of radar transmit antennas and each of the plurality of radar receive antennas comprise a patch antenna having a rectangular shape including a pair of longitudinal sides of a first length being parallel and spaced from one another and a pair of lateral sides of a second length a being parallel and spaced from one another and extending between the pair of longitudinal sides and a first feed and a second feed for each coupling to one of a pair of excitation lines.

7. The sensor assembly as set forth in claim 6, wherein the patch antenna defines a pair of truncated corners disposed diagonally opposite one another.

8. The sensor assembly as set forth in claim 6, wherein the patch antenna defines a plurality of perturbations formed as at least one longitudinal notch along each of the pair of longitudinal sides and a plurality of lateral notches along each of the pair of lateral sides.

9. The sensor assembly as set forth in claim 6, wherein the patch antenna defines a rectangular slot extending therethrough and diagonally across the patch antenna.

10. The sensor assembly as set forth in claim 6, further including a feed network configured to electrically couple to the first feed and the second feed.

11. The sensor assembly as set forth in claim 10, wherein the feed network comprises one of a hybrid coupler coupled to the first feed and the second feed and an offset coupler coupled to the first feed and the second feed.

12. The sensor assembly as set forth in claim 1, wherein the plurality of radar transmit antennas includes at least one linearly polarized transmit antenna and at least one left hand circularly polarized antenna and at least one right hand circularly polarized antenna and the plurality of radar receive antennas includes at least one linearly polarized transmit antenna and at least one left hand circularly polarized antenna and at least one right hand circularly polarized antenna.

13. The sensor assembly as set forth in claim 1, wherein the sensor assembly is electrically coupled to an object detection system for controlling a vehicle function with the detection of the object relative to the sensor assembly.

14. A method of operating a sensor assembly for detecting an object comprising the steps of:
  emitting transmitted radar waves having a first polarization using at least one radar transmitter including a plurality of transmit encoding switches each coupled to one of a plurality of radar transmit antennas each configured to transmit the transmitted radar waves with a different respective polarization than another one of the plurality of radar transmit antennas;
  controlling the plurality of transmit encoding switches to modulate a radar signature comprised of sequential transmissions by each of the plurality of radar transmit antennas;
  receiving the transmitted radar waves after reflecting from the object as reflected radar waves having a second polarization different than the first polarization and corresponding with a detection of the object relative to the sensor assembly using at least one radar receiver including a plurality of receive decoding switches each coupled to one of a plurality of radar receive antennas each configured to receive the reflected radar waves with the different respective polarization;
  rejecting radar waves having a polarization being different than the second polarization to disregard noise generated by environmental interaction of the transmitted radar waves and from extraneous radar sources using the at least one radar receiver;
  controlling the plurality of receive decoding switches to receive the reflected radar signature; and
  detecting the object relative to the sensor assembly using the at least one radar receiver.

15. The method as set forth in claim 14, wherein the second polarization is an inverted form of the first polarization.

16. The method as set forth in claim 14, wherein the first polarization of the transmitted radar waves is one of a left hand circular polarization and a right hand circular polarization and the second polarization of the reflected radar waves is the other one of the left hand circular polarization and the right hand circular polarization.

* * * * *